United States Patent
Lee et al.

(10) Patent No.: US 12,047,146 B2
(45) Date of Patent: Jul. 23, 2024

(54) METHOD AND APPARATUS FOR CSI REPORTING IN DISTRIBUTED MIMO

(71) Applicant: Samsung Electronics Co., Ltd., Suwon-si (KR)

(72) Inventors: Gilwon Lee, McKinney, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 17/685,244

(22) Filed: Mar. 2, 2022

(65) Prior Publication Data

US 2022/0286178 A1 Sep. 8, 2022

Related U.S. Application Data

(60) Provisional application No. 63/156,120, filed on Mar. 3, 2021, provisional application No. 63/156,097, filed on Mar. 3, 2021.

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04L 5/0051* (2013.01); *H04W 88/085* (2013.01)

(58) Field of Classification Search
CPC .............. H04B 7/0626; H04B 7/0417; H04B 7/0695; H04B 7/024; H04L 5/0051;
(Continued)

(56) References Cited

U.S. PATENT DOCUMENTS

2012/0213108 A1* 8/2012 Ji .................. H04B 7/024
370/252
2013/0021926 A1 1/2013 Geirhofer et al.
(Continued)

FOREIGN PATENT DOCUMENTS

WO 2020056708 A1 3/2020
WO 2020144602 A1 7/2020

OTHER PUBLICATIONS

"CSI Feedback for Distributed MIMO"; Lee et al.; 2022 IEEE Wireless Communications and Networking Conference (WCNC); 2022 (Year: 2022).*

(Continued)

*Primary Examiner* — Benjamin H Elliott, IV

(57) ABSTRACT

Apparatuses and methods for CSI reporting in distributed MIMO in a wireless communication system is provided. The method includes receiving a channel state information (CSI) report setting about a first type of information CSI(0), . . . , CSI($N_{CSI-1}$) for $N_{CSI}>1$, receiving a CSI reference signal (CSI-RS) resource setting about a plurality of CSI-RS resources, CSI-RS(0), . . . , CSI-RS($N_{RRH}-1$) transmitted from $N_{RRH}$ groups of CSI-RS ports, wherein $N_{RRH}$ is a number of remote radio heads (RRH). The method further includes measuring the plurality of CSI-RS resources CSI-RS(0), . . . , CSI-RS($N_{RRH}-1$), determining, based on the measurement, the first type of information CSI(0), . . . , CSI($N_{CSI}-1$); and transmitting information indicating the first type of information CSI(0), . . . , CSI($N_{CSI}-1$).

20 Claims, 11 Drawing Sheets

(51) Int. Cl.
*H04L 5/00* (2006.01)
*H04W 88/08* (2009.01)

(58) Field of Classification Search
CPC ..... H04L 5/0057; H04L 5/005; H04L 5/0048; H04W 88/085; H04W 72/23
See application file for complete search history.

(56) References Cited

U.S. PATENT DOCUMENTS

| | | | | |
|---|---|---|---|---|
| 2015/0036664 | A1* | 2/2015 | Yuk | H04W 36/0069 370/332 |
| 2017/0201970 | A1* | 7/2017 | Takano | H04B 7/024 |
| 2018/0234146 | A1* | 8/2018 | Onggosanusi | H04W 72/23 |
| 2019/0123864 | A1* | 4/2019 | Zhang | H04L 5/005 |
| 2020/0403660 | A1* | 12/2020 | Zhang | H04L 5/0023 |
| 2021/0226751 | A1* | 7/2021 | Zhang | H04W 72/21 |
| 2021/0328644 | A1* | 10/2021 | Hao | H04L 5/0057 |
| 2022/0190897 | A1* | 6/2022 | Rahman | H04B 7/0626 |
| 2022/0286178 | A1* | 9/2022 | Lee | H04B 7/0417 |
| 2023/0283329 | A1* | 9/2023 | Rahman | H04B 7/0478 375/262 |

OTHER PUBLICATIONS

International Search Report and Written Opinion issued Jun. 13, 2022 regarding International Application No. PCT/KR2022/003017, 7 pages.
"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.
"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Oct. 2021, 144 pages.
"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"3rd Generation Partnership Project; Technical Specification Group Radio Access Network; NR; Physical layer measurements (Release 17)", 3GPP TS 38.215 V17.0.0, Dec. 2021, 26 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
Extended European Search Report issued May 16, 2024 regarding Application No. 22763611.5, 8 pages.
Huawei et al., "Performance evaluation of DL Comp in scenario 4", 3GPP TSG RAN WGl meeting #65, R1-111249, May 2011, 6 pages.

* cited by examiner

METHOD AND APPARATUS FOR CSI REPORTING IN DISTRIBUTED MIMO

CROSS-REFERENCE TO RELATED APPLICATIONS AND CLAIM OF PRIORITY

The present application claims priority to U.S. Provisional Patent Application No. 63/156,097, filed on Mar. 3, 2021, and U.S. Provisional Patent Application No. 63/156,120, filed on Mar. 3, 2021. The content of the above-identified patent documents is incorporated herein by reference.

TECHNICAL FIELD

The present disclosure relates generally to wireless communication systems and more specifically to methods and apparatus for CSI reporting in distributed MIMO.

BACKGROUND

For a cellular system operating in a sub-1 GHz frequency range (e.g., less than 1 GHz), supporting a large number of CSI-RS antenna ports (e.g., 32) at a single location or remote radio head (RRH) is challenging due to the fact that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location.

SUMMARY

Embodiments of the present disclosure provide methods and apparatuses for CSI reporting in distributed MIMO in a wireless communication system.

In one embodiment, a UE in a wireless communication system is provided. The UE includes a transceiver configured to receive a channel state information (CSI) report setting about a first type of information CSI(0), . . . , CSI($N_{CSI-1}$) for $N_{CSI}>1$; and receive a CSI reference signal (CSI-RS) resource setting about a plurality of CSI-RS resources, CSI-RS(0), . . . , CSI-RS($N_{RRH}-1$) transmitted from $N_{RRH}$ groups of CSI-RS ports, wherein $N_{RRH}$ is a number of remote radio heads (RRH). The UE further includes a processor coupled to the transceiver. The processor is configured to: measure the plurality of CSI-RS resources CSI-RS(0), . . . , CSI-RS($N_{RRH}-1$); and determine, based on the measurement, the first type of information CSI(0), . . . , CSI($N_{CSI}-1$). The transceiver is further configured to transmit information indicating the first type of information CSI(0), . . . , CSI($N_{CSI}-1$).

In another embodiment, a BS in a wireless communication system is provided. The BS includes a processor configured to generate a CSI report setting about a first type of information CSI(0), . . . , CSI($N_{CSI-1}$) for $N_{CSI}>1$; and generate a CSI-RS resource setting about a plurality of CSI-RS resources CSI-RS(0), . . . , CSI-RS($N_{RRH}-1$) transmitted from $N_{RRH}$ groups of CSI-RS ports, wherein $N_{RRH}$ is a number of RRH. The BS further includes a transceiver operably coupled to the processor. The transceiver is configured to: transmit the CSI report setting and the CSI-RS resource setting; and receive information indicating the first type of information CSI(0), . . . , CSI ($N_{CSI}-1$); wherein the information indicating the first type of information CSI(0), . . . , CSI($N_{CSI}-1$) is based on the at least one CSI report setting, the at least one CSI-RS resource setting, and the plurality of CSI-RS resources CSI-RS(0), . . . , CSI-RS ($N_{RRH}-1$).

In yet another embodiment, a method for operating a UE is provided. The method comprises: receiving a CSI report setting about a first type of information CSI(0), . . . , CSI($N_{CSI-1}$) for $N_{CSI}>1$; receiving a CSI-RS resource setting about a plurality of CSI-RS resources, CSI-RS(0), . . . , CSI-RS($N_{RRH}-1$) transmitted from $N_{RRH}$ groups of CSI-RS ports, wherein $N_{RRH}$ is a number of RRH; measuring the plurality of CSI-RS resources CSI-RS(0), . . . , CSI-RS ($N_{RRH}-1$); determining, based on the measurement, the first type of information CSI(0), . . . , CSI($N_{CSI}-1$); and transmitting information indicating the first type of information CSI(0), . . . , CSI($N_{CSI}-1$).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
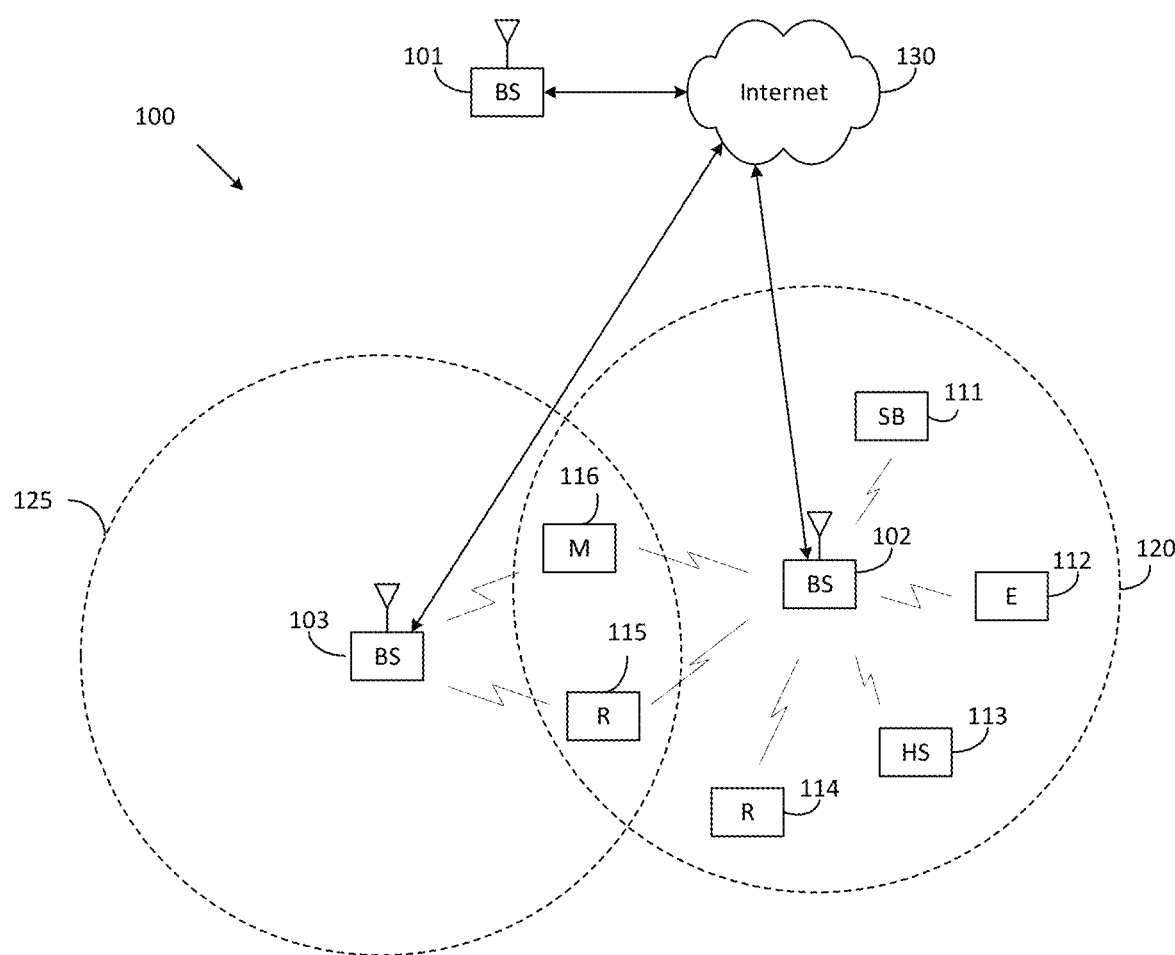
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v16.6.0, "E-UTRA, Medium Access Control (MAC) protocol specification" (herein "REF 4"); 3GPP TS 36.331 v16.7.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v16.7.0, "NR, Medium Access Control (MAC) protocol specification" (herein "REF 11"); 3GPP TS 38.331 v16.7.0, and "NR, Radio Resource Control (RRC) Protocol Specification" (herein "REF 12"). Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
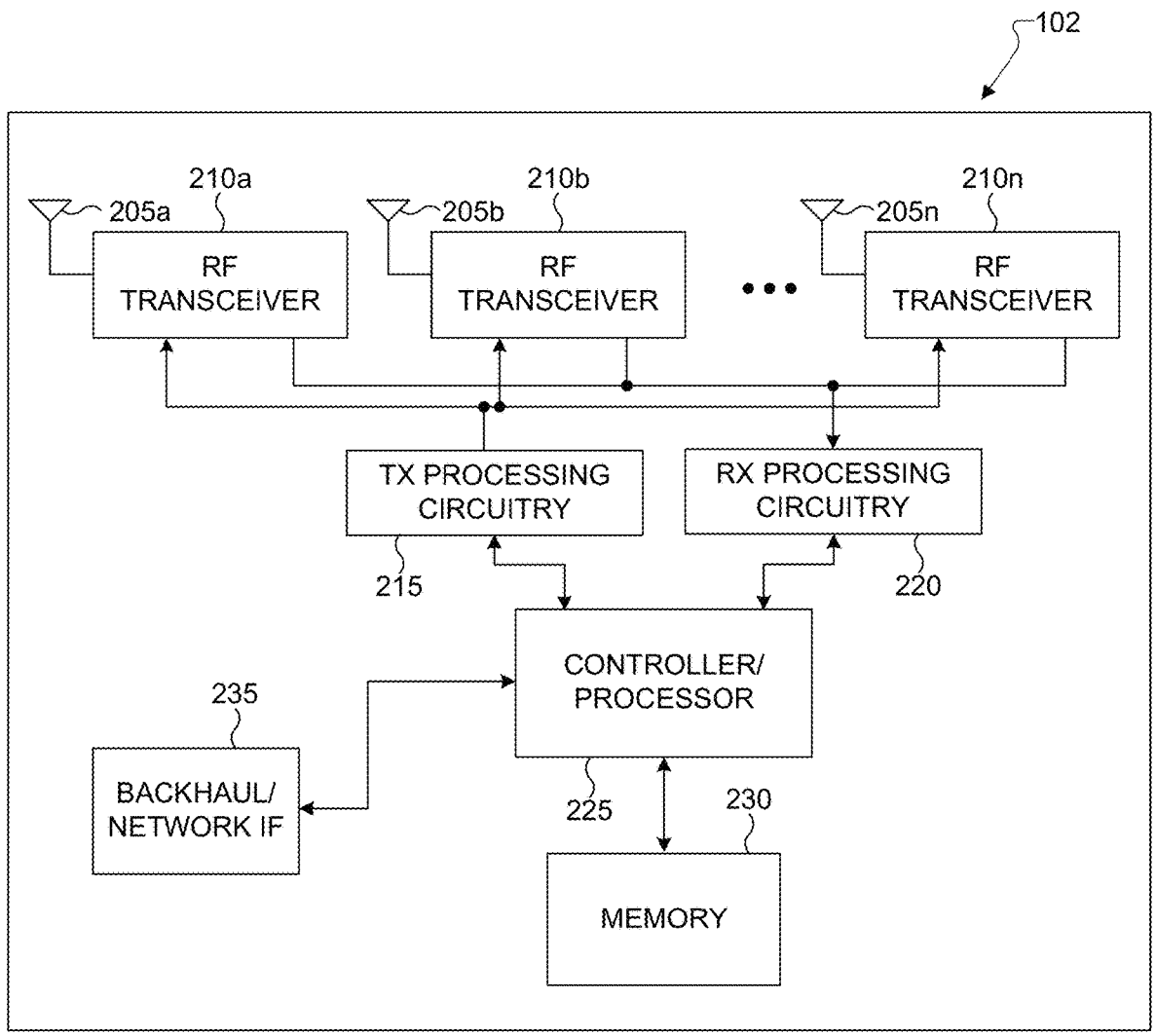
FIG. 2 illustrates an example gNB according to embodiments of the present disclosure.
Figure 3:
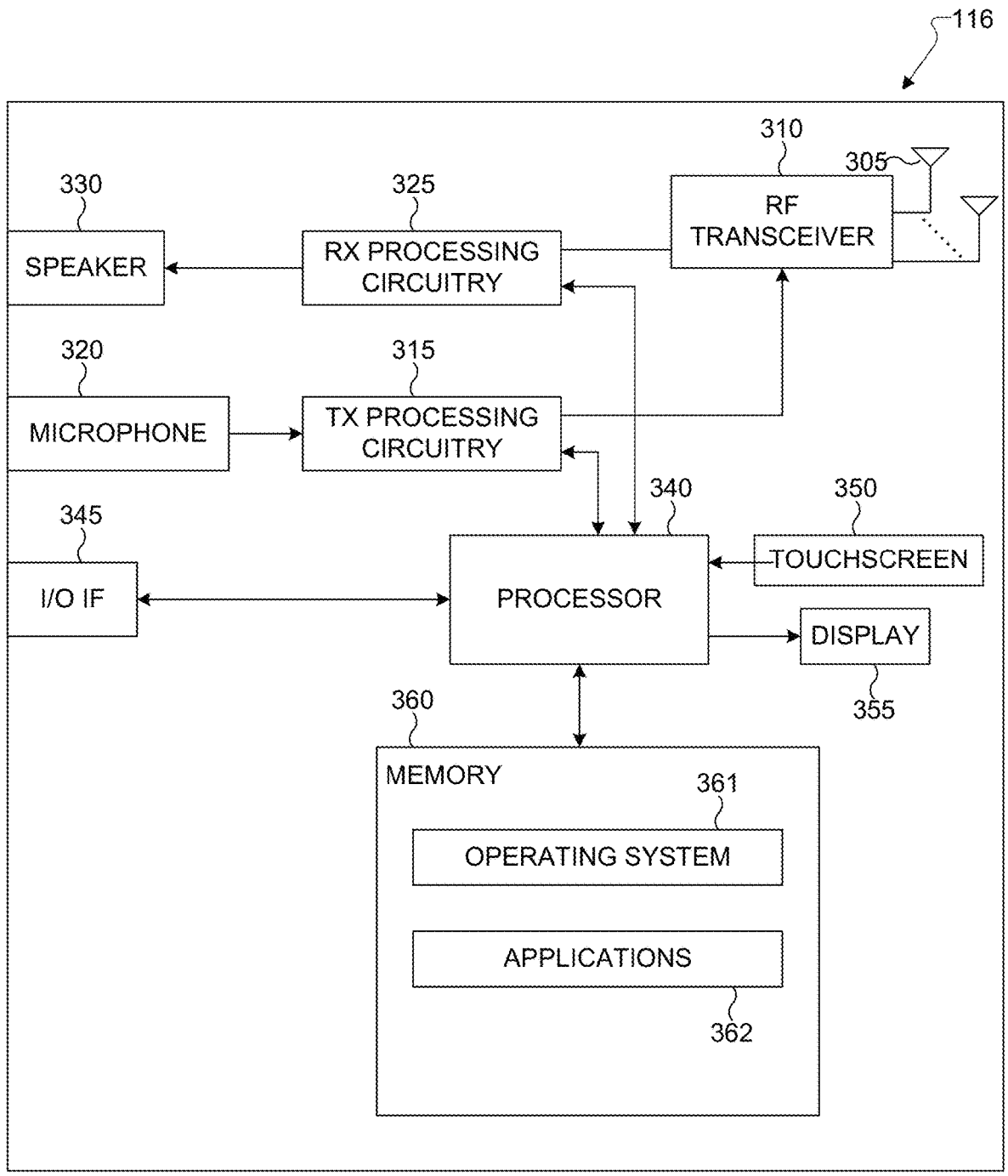
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for receiving a channel state information (CSI) report setting about a first type of information CSI(0), ..., CSI($N_{CSI-1}$) for $N_{CSI}>1$; receiving a CSI reference signal (CSI-RS) resource setting about a plurality of CSI-RS resources, CSI-RS(0), ..., CSI-RS($N_{RRH}-1$) transmitted from $N_{RRH}$ groups of CSI-RS ports, wherein $N_{RRH}$ is a number of remote radio heads (RRH); measuring the plurality of CSI-RS resources CSI-RS(0), ..., CSI-RS($N_{RRH}-1$); determining, based on the measurement, the first type of information CSI(0), ..., CSI($N_{CSI}-1$); and transmitting information indicating the first type of information CSI(0), ..., CSI ($N_{CSI}-1$). One or more of the gNBs 101-103 includes circuitry, programming, or a combination thereof, for generating a channel state information (CSI) report setting about a first type of information CSI(0), ..., CSI($N_{CSI-1}$) for $N_{CSI}>1$; generating a CSI reference signal (CSI-RS) resource setting about a plurality of CSI-RS resources CSI-RS(0), ..., CSI-RS($N_{RRH}-1$) transmitted from $N_{RRH}$ groups of CSI-RS ports, wherein $N_{RRH}$ is a number of remote radio heads (RRH); transmitting the CSI report setting and the CSI-RS resource setting; and receiving information indicating the first type of information CSI(0), ..., CSI($N_{CSI}-1$); wherein the information indicating the first type of information CSI(0), ..., CSI($N_{CSI}-1$) is based on the at least one CSI report setting, the at least one CSI-RS resource setting, and the plurality of CSI-RS resources CSI-RS(0), ..., CSI-RS($N_{RRH}-1$).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving a channel state information (CSI) report setting about a first type of information CSI(0), ..., CSI($N_{CSI}$-1) for $N_{CSI}$>1; receiving a CSI reference signal (CSI-RS) resource setting about a plurality of CSI-RS resources, CSI-RS(0), ..., CSI-RS($N_{RRH}$-1) transmitted from $N_{RRH}$ groups of CSI-RS ports, wherein $N_{RRH}$ is a number of remote radio heads (RRH); measuring the plurality of CSI-RS resources CSI-RS(0), ..., CSI-RS($N_{RRH}$-1); determining, based on the measurement, the first type of information CSI(0), ..., CSI($N_{CSI}$-1); and transmitting information indicating the first type of information CSI(0), ..., CSI($N_{CSI}$-1). The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
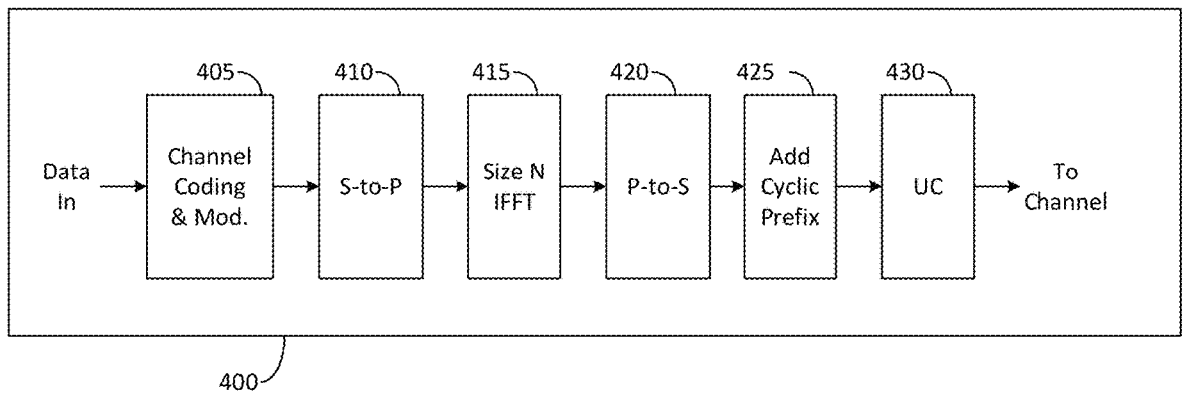
FIG. 4A illustrates a high-level diagram of an orthogonal frequency division multiple access transmit path according to embodiments of the present disclosure.
Figure 4B:
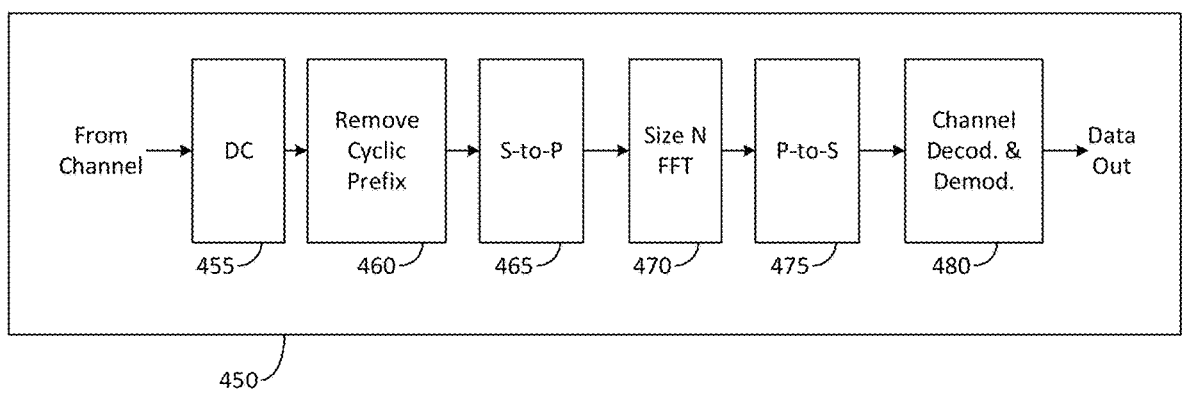
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s = (n_{s0} + y \cdot N_{EPDCCH})$ mod D RBs for a total of $Z = O_F + \lfloor (n_{s0} + y \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB} = 1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$, where $N_{SRS} = 1$ if a last subframe symbol is used to transmit SRS and $N_{SRS} = 0$ otherwise.

Figure 5:
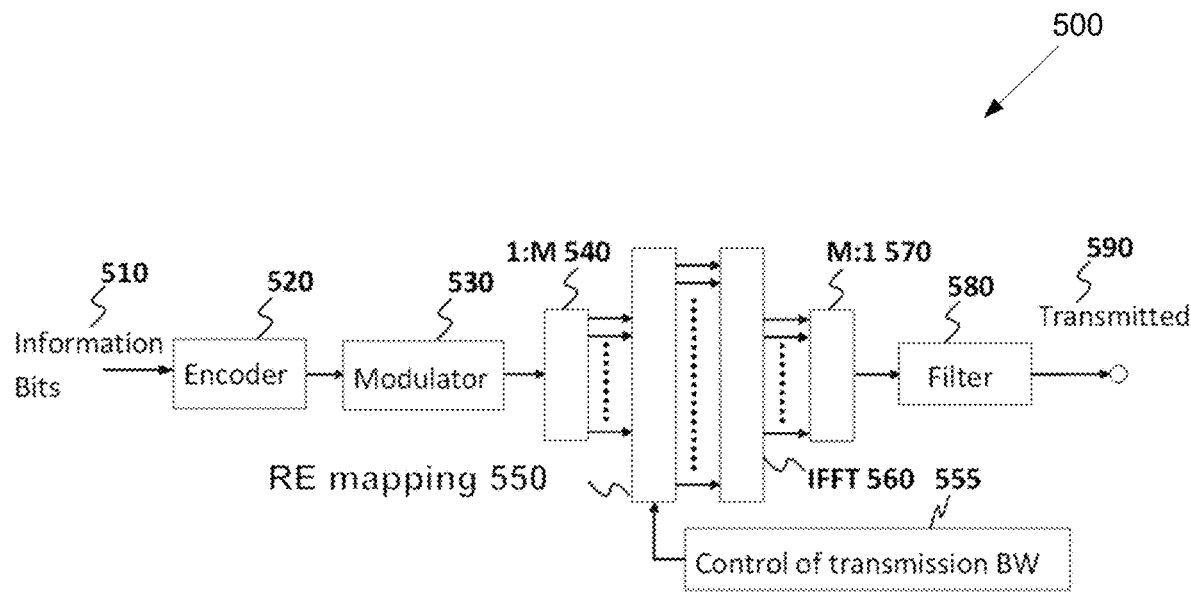
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
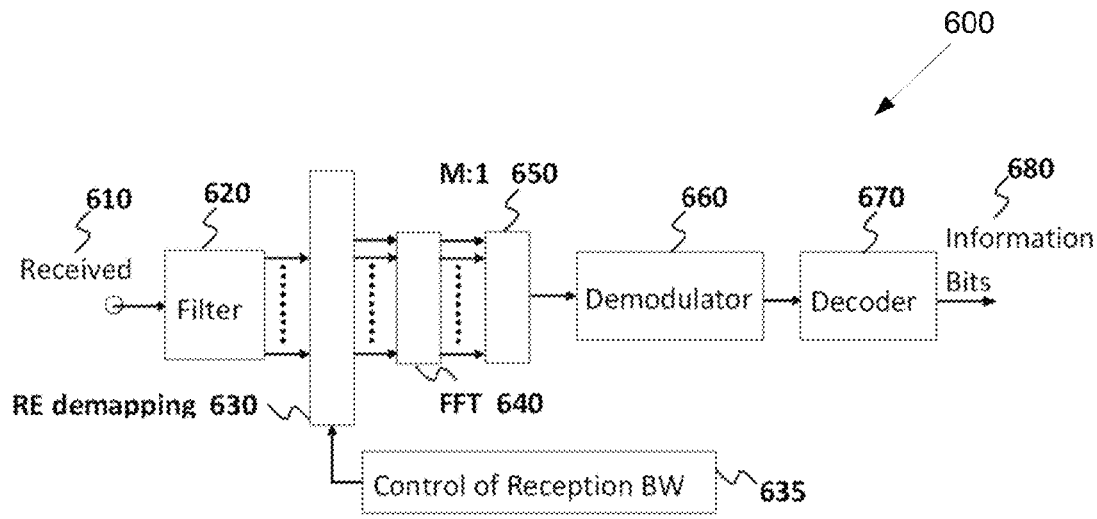
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
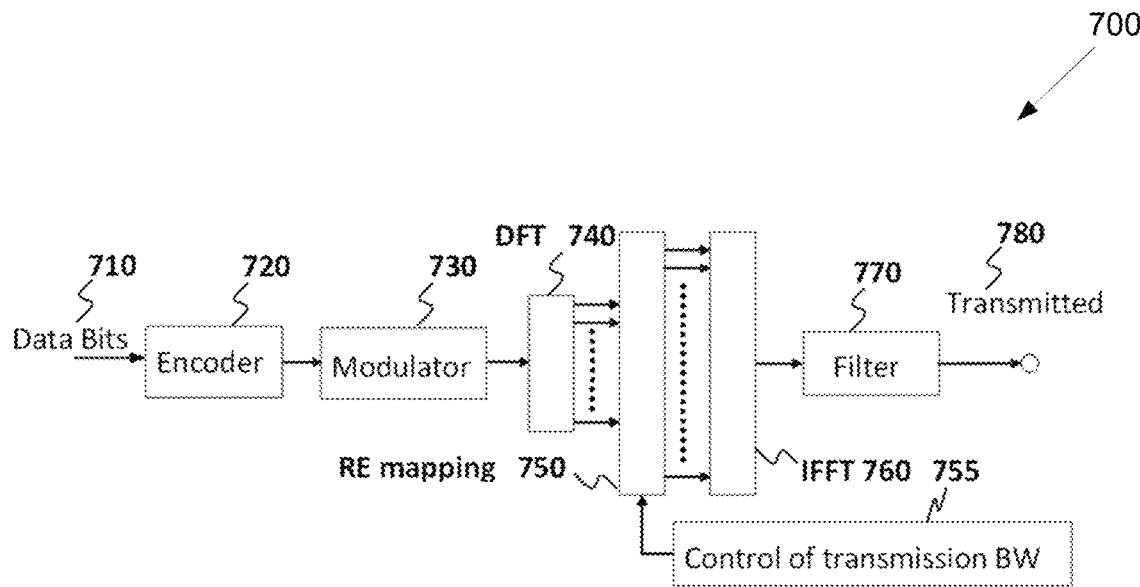
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
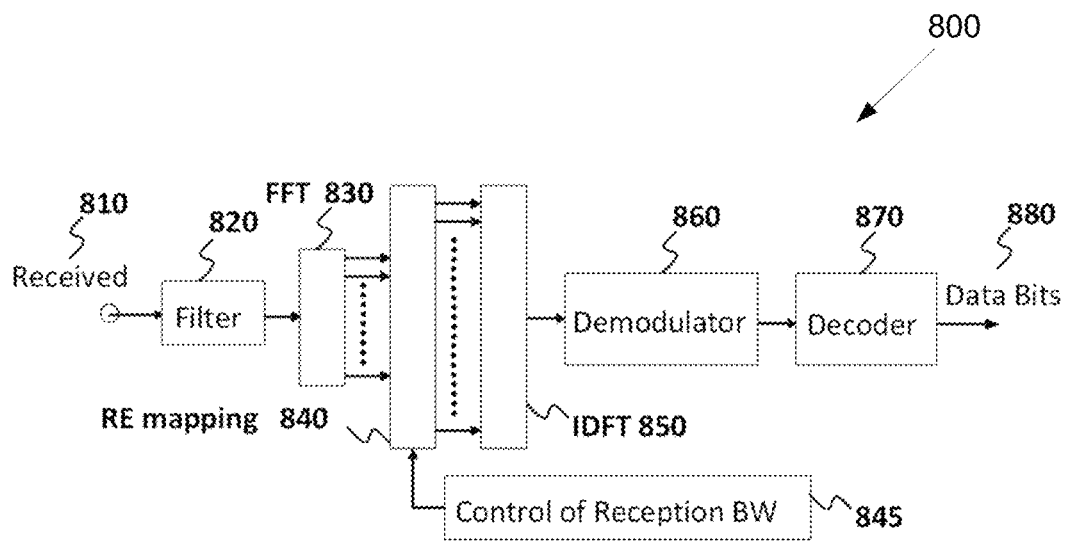
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
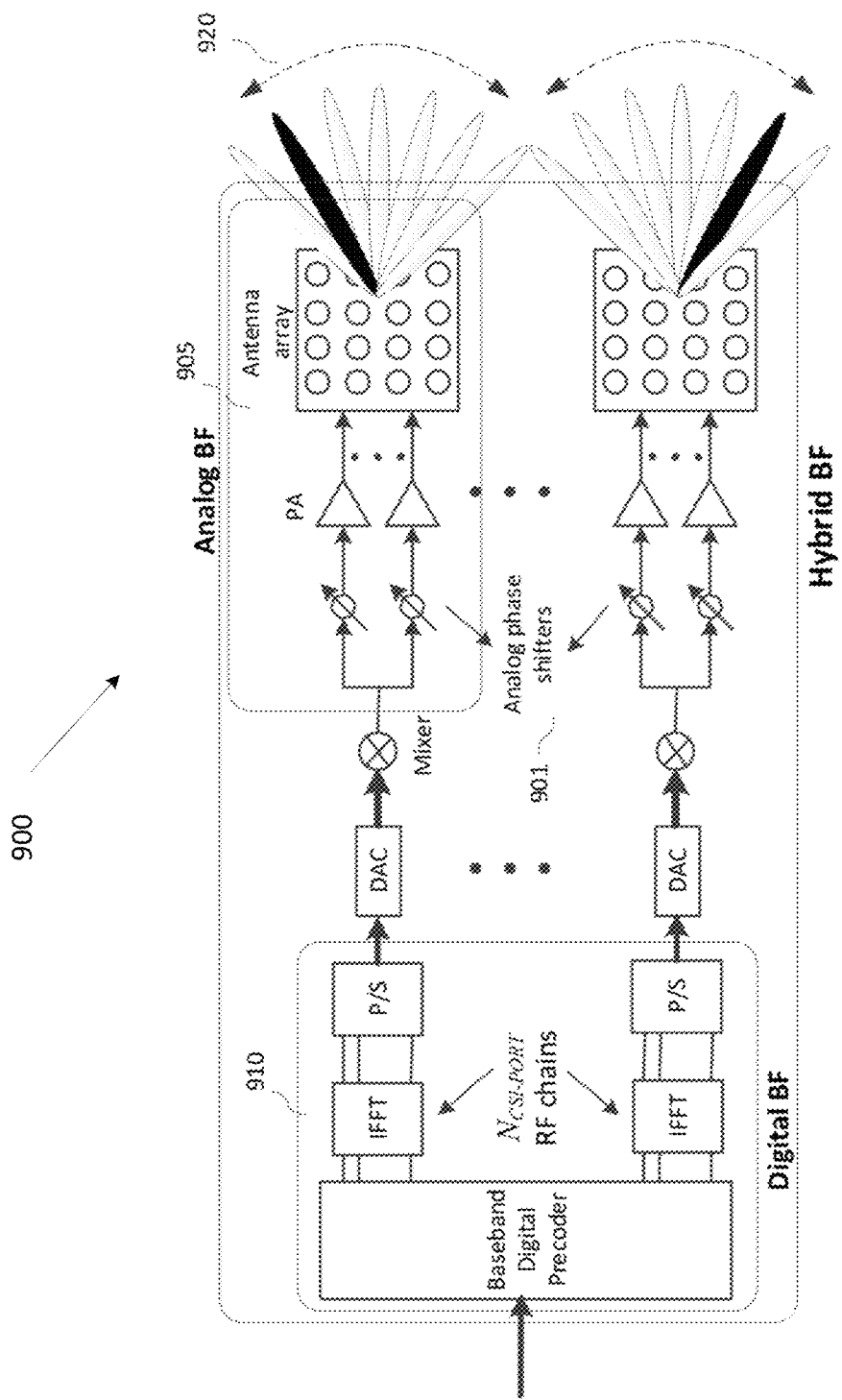
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength. As an example, for the case of the wavelength size (X) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Figure 10:
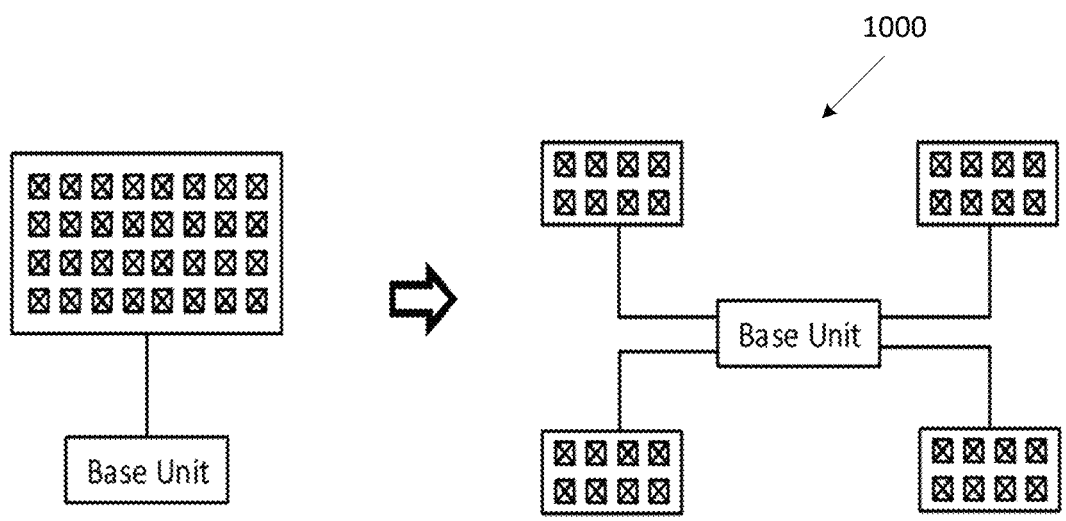
FIG. 10 illustrates an example D-MIMO system according to embodiments of the present disclosure.

FIG. 10 illustrates an example system for D-MIMO 1000 according to embodiments of the present disclosure. The embodiment of the example system for D-MIMO 1000 illustrated in FIG. 10 is for illustration only. FIG. 10 does not limit the scope of this disclosure to any particular implementation of the example system for D-MIMO 1000.

As illustrated in FIG. 10, one approach to resolve the issue described above is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 18.

Figure 11:
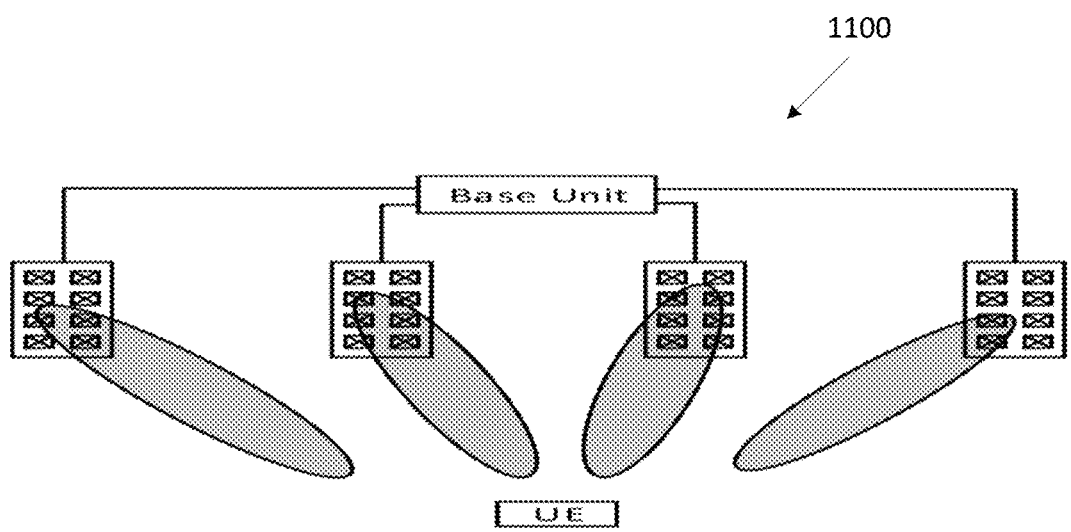
FIG. 11 illustrates an example D-MIMO system according to embodiments of the present disclosure.

FIG. 11 illustrates an example system for D-MIMO 1100 according to embodiments of the present disclosure. The embodiment of the example system for D-MIMO 1100 illustrated in FIG. 11 is for illustration only. FIG. 11 does not limit the scope of this disclosure to any particular implementation of the example system for D-MIMO 1100.

As illustrated in FIG. 11, the multiple antenna panels at multiple locations can still be connected to a single base unit, and thus the signal transmitted/received via multiple distributed panels can be processed in a centralized manner through the single base unit. In another embodiment, it is possible that multiple distributed antenna panels are connected to more than one base units, which communicates with each other and jointly supporting single antenna system.

One issue that can occur in distributed MIMO is that the amount of CSI reporting overhead becomes huge. One approach to resolve the issue of the large CSI overhead is to introduce an efficient CSI codebook tailored for distributed MIMO, for example, using panel/RRH domain compression. The amount of CSI feedback can be drastically reduced by exploiting the channel correlations among panels/RRHs in CSI codebook design. However, in general cases, it is not guaranteed that the channel correlation among panels/RRHs exists, and thus the CSI report comprising all of the CSI for all RRHs/panels without compression may be needed. In this case, if Type-II based multi-panel/multi-RRH codebook is designed and spatial domain (SD) and frequency domain (FD) bases are independently selected for each of the RRHs/panels, the amount of channel coefficients corresponding to SD/FD vector pairs to be reported to the NW will linearly increase with the number of RRHs/panels and thus become very large. Thus, it is expected that multiple CSI reporting instants (blocks) becomes inevitable.

This disclosure proposes multiple CSI reporting methods to support such an issue in distributed MIMO.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI parameter band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

In one embodiment I, a UE is configured to report common CSI for multiple RRHs/panels.

In one embodiment I.1, the common CSI reporting contains a common spatial domain (SD) basis and a common frequency domain (FD) basis for multiple RRHs/panels. The common SD and FD bases are reported for the multiple RRHs/panels.

In one embodiment I.1.1, for each RRH/panel, the channel coefficients corresponding to the common SD and FD vector pairs are reported (for a given layer). This allows the UE to report different channel coefficients for different panels or RRHs under the common SD and FD vector pairs. In this case, the CSI feedback overhead for the channel coefficients will (almost) linearly increase with respect to the number of RRHs/panels.

In one embodiment I.1.2, some part of the channel coefficients corresponding to the common SD and FD vector pairs are the same for a subset of RRHs/panels and reported.

In one example I.1.2.1, an indicator parameter is specified to indicate the positions of the channel coefficients being the same for a subset of RRHs/panels. Once the positions are specified, it is enough to report a single coefficient (or a single pair of coefficients which are quantized separately, e.g., for phase and amplitude) for each position for the subset of RRHs/panels.

In one example I.1.2.2, for the case of two RRHs/panels, a bit-map parameter to indicate the positions of the channel coefficients being the same for the two RRHs/panels is specified and reported. For example, '0' of the bit map parameter implies that they have a different channel coefficient for the corresponding position, and '1' of the bit map parameter implies that they have the same channel coefficient (or the same pair of channel coefficient) for the corresponding position. In other words, for the positions corresponding to 0s, the UE reports two channel coefficients (i.e., for two RRH case) for each of the positions. For the positions corresponding to is, the UE reports a single channel coefficient (or a single pair of coefficients) for each of the positions.

In one example I.1.2.3, the above example can be extended to the case of having more than two RRHs/panels.

In one example I.1.2.4, for the case of two RRHs/panels, each coefficient for one RRH can be computed by using the corresponding coefficient of the other (reference) RRH and a coefficient that can be selected from another quantization codebook X. For example, each coefficient for the reference RRH is selected from the original quantization codebook (e.g., phase and amplitude in Type-II Rel-16/17) and each coefficient for the other RRH is selected from another codebook X (which potentially has a smaller cardinality than that of the original codebook). The actual channel coefficient for the non-reference RRH can be computed by multiplying its own coefficient with the coefficient of the reference RRH. In other words, this example allows the UE to report the non-reference RRH's CSI in a differential manner from the reference RRH's CSI.

In one example I.1.2.5, the above example can be extended to the case of having more than two RRHs/panels. For instance, channel coefficients for the reference RRH are selected from the original codebook and coefficients for the other RRHs are selected from the additional quantization codebook X, and channel coefficients for the other RRHs are computed by using the reference RRH's channel coefficients and their own coefficients (i.e., differential coefficients).

In one embodiment I.2, the common CSI reporting contains a common spatial domain (SD) basis for multiple RRHs/panels.

In one example, selected FD bases for multiple RRHs/panels can be different.

In another example, FD bases are not considered in CSI reporting, i.e., no FD compression is applied. This example is Rel-15 Type-II codebook where FD bases are equal to identity (i.e., $W_f=I$) for multiple RRHs/panels.

In another example, Type-I codebook can be relevant to this case, since there is no FD basis notion in Type-I codebook.

In one embodiment I.2.1, for each RRH/panel, the channel coefficients corresponding to the common SD vectors (and its own FD vector pairs) are reported (for a given layer). This allows the UE to report different channel coefficients for different panels or RRHs under the common SD vectors (and its own FD vector pairs). In this case, the CSI feedback overhead for the channel coefficients will (almost) linearly increase with respect to the number of RRHs/panels.

In one embodiment I.2.2, some part of the channel coefficients corresponding to the common SD vectors are the same for a subset of RRHs/panels and reported.

In one example I.2.2.1, an indicator parameter is specified to indicate the positions of the channel coefficients being the same for a subset of RRHs/panels. Once the positions are specified, it is enough to report a single coefficient (or a single pair of coefficients which are quantized separately, e.g., for phase and amplitude) for each position for the subset of RRHs/panels.

In one example I.2.2.2, for the case of two RRHs/panels, a bit-map parameter to indicate the positions of the channel coefficients being the same for the two RRHs/panels is specified and reported. For example, '0' of the bit map parameter implies that they have different channel coefficient for the corresponding position, and '1' of the bit map parameter implies that they have the same channel coefficient (or the same pair of channel coefficient) for the corresponding position. In other words, for the positions corresponding to 0s, the UE reports two channel coefficients (i.e., for two RRH case) for each of the positions. For the positions corresponding to is, the UE reports a single channel coefficient (or a single pair of coefficients) for each of the positions.

In one example I.2.2.3, the above example can be extended to the case of having more than two RRHs/panels.

In one example I.2.2.4, for the case of two RRHs/panels, each coefficient for one RRH can be computed by using the corresponding coefficient of the other (reference) RRH and a coefficient that can be selected from another quantization codebook X. For example, each coefficient for the reference RRH is selected from the original quantization codebook (e.g., phase and amplitude in Type-II Rel-16/17) and each coefficient for the other RRH is selected from another codebook X (which potentially has a smaller cardinality than that of the original codebook). The actual channel coefficient for the non-reference RRH can be computed by multiplying its own coefficient with the coefficient of the reference RRH. In other words, this example allows the UE to report the non-reference RRH's CSI in a differential manner from the reference RRH's CSI.

In one example I.2.2.5, the above example can be extended to the case of having more than two RRHs/panels. For instance, channel coefficients for the reference RRH are selected from the original codebook and coefficients for the other RRHs are selected from the additional quantization codebook X, and channel coefficients for the other RRHs are computed by using the reference RRH's channel coefficients and their own coefficients (i.e., differential coefficients).

In one embodiment I.3, the common CSI reporting contains a common frequency domain (FD) basis for multiple RRHs/panels.

In one example, selected SD bases for multiple RRHs/panels can be different.

In one example, SD bases are not considered in CSI reporting, i.e., no SD compression is applied. This example is the case where SD bases are equal to identity (i.e., $W_1=I$) for multiple RRHs/panels.

In one embodiment I.3.1, for each RRH/panel, the channel coefficients corresponding to the common FD vectors (and its own SD vector pairs) are reported (for a given layer). This allows the UE to report different channel coefficients for different panels or RRHs under the common FD vectors (and its own FD vector pairs). In this case, the CSI feedback overhead for the channel coefficients will (almost) linearly increase with respect to the number of RRHs/panels.

In one embodiment I.3.2, some part of the channel coefficients corresponding to the common FD vectors are the same for a subset of RRHs/panels and reported.

In one example I.3.2.1, an indicator parameter is specified to indicate the positions of the channel coefficients being the same for a subset of RRHs/panels. Once the positions are specified, it is enough to report a single coefficient (or a single pair of coefficients which are quantized separately, e.g., for phase and amplitude) for each position for the subset of RRHs/panels.

In one example I.3.2.2, for the case of two RRHs/panels, a bit-map parameter to indicate the positions of the channel coefficients being the same for the two RRHs/panels is specified and reported. For example, '0' of the bit map parameter implies that they have different channel coefficient for the corresponding position, and '1' of the bit map parameter implies that they have the same channel coefficient (or the same pair of channel coefficient) for the corresponding position. In other words, for the positions corresponding to 0s, the UE reports two channel coefficients (i.e., for two RRH case) for each of the positions. For the positions corresponding to is, the UE reports a single channel coefficient (or a single pair of coefficients) for each of the positions.

In one example I.3.2.3, the above example can be extended to the case of having more than two RRHs/panels.

In one example I.3.2.4, for the case of two RRHs/panels, each coefficient for one RRH can be computed by using the corresponding coefficient of the other (reference) RRH and a coefficient that can be selected from another quantization codebook X. For example, each coefficient for the reference RRH is selected from the original quantization codebook (e.g., phase and amplitude in Type-II Rel-16/17) and each coefficient for the other RRH is selected from another codebook X (which potentially has a smaller cardinality than that of the original codebook). The actual channel coefficient for the non-reference RRH can be computed by multiplying its own coefficient with the coefficient of the reference RRH. In other words, this example allows the UE to report the non-reference RRH's CSI in a differential manner from the reference RRH's CSI.

In one example I.3.2.5, the above example can be extended to the case of having more than two RRHs/panels. For instance, channel coefficients for the reference RRH are selected from the original codebook and coefficients for the other RRHs are selected from the additional quantization codebook X, and channel coefficients for the other RRHs are computed by using the reference RRH's channel coefficients and their own coefficients (i.e., differential coefficients).

Figure 12:
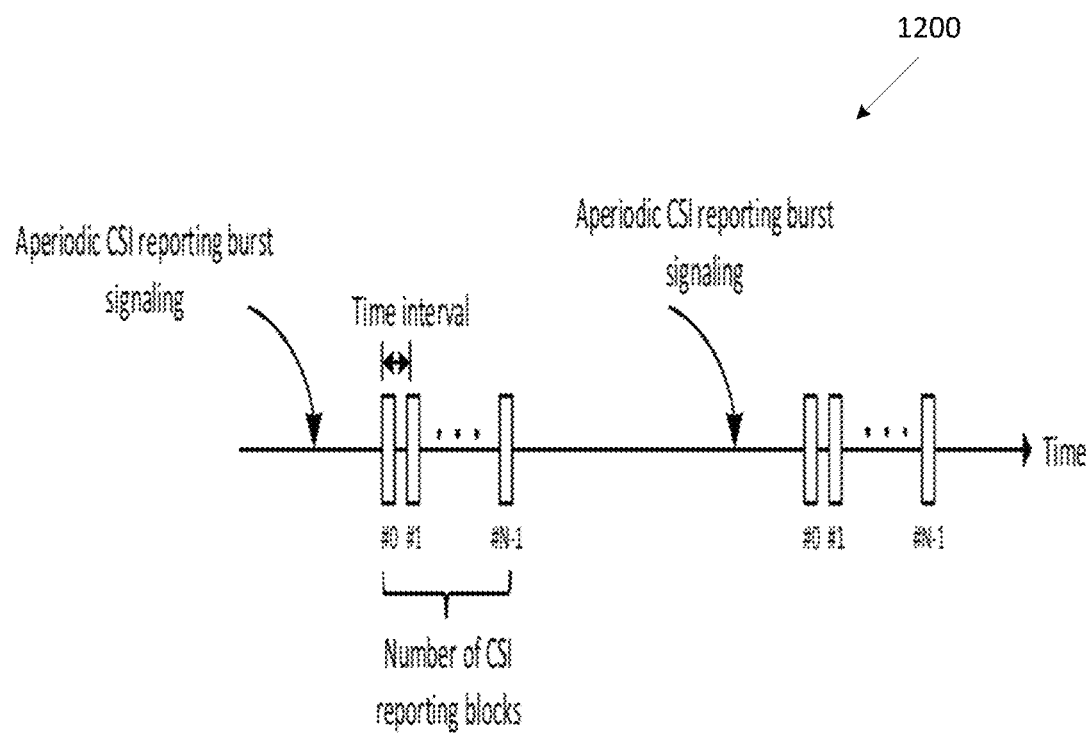
FIG. 12 illustrates an example of multiple CSI reporting based on aperiodic CSI reporting burst signaling according to embodiments of the present disclosure.

FIG. 12 illustrates an example of multiple CSI reporting 1200 based on aperiodic CSI reporting burst signaling according to embodiments of the present disclosure. The embodiment of the example of multiple CSI reporting 1200 illustrated in FIG. 12 is for illustration only. FIG. 12 does not limit the scope of this disclosure to any particular implementation of the example of multiple CSI reporting 1200.

In one embodiment, a UE is configured to report CSI at $N_{CSI}$ CSI reporting instants (blocks). $N_{CSI}$ can be configured by the NW or predetermined with some rules or chosen by the UE under some constraints/configurations. In one example, $N_{CSI}=2, 4, 8, 16$. In another example, $N_{CSI}=2, 4, 6, 8$. The time interval tint between two adjacent CSI reporting blocks can be configured or predetermined with some rule. In one example, $t_{int}=1, 2, 3, 4$ ms. In another example, $t_{int}=0.5, 1, 1, 5, 2$ ms. Frequency resources (RB/RBG locations) that are used for each CSI reporting block can be configured or predetermined with some rules. In one example, the frequency resources can be different from different CSI reporting blocks. In another example, the frequency resources can be the same for the CSI reporting blocks. FIG. 12 shows an illustration of multiple CSI reporting based on aperiodic CSI reporting burst signaling.

In one embodiment II, a UE is configured to report CSI via multiple CSI reporting instants (blocks) where each CSI reporting block contains either common CSI or individual CSI.

In one embodiment II.1, one or multiple CSI reporting blocks contain common CSI for multiple RRHs/panels and each of the CSI reporting blocks contains a common SD basis for multiple RRHs/panels.

In one example, the common CSI at each of the CSI reporting blocks is indicated/reported according to embodiment I.2 (or an embodiment, e.g., I.2.1, I.2.2 . . . under embodiment I.2).

In one example, other remaining CSI reporting block(s) contain individual CSI for one or multiple RRHs/panels. The individual CSI for multiple RRHs/panels means that there is no common basis notion for the multiple RRHs/panels and thus SD/FD vectors and channel coefficients corresponding to SD/FD vector pairs are independently (not commonly) indicated/reported for each of the multiple RRHs/panels.

In one example II.1.1, two CSI reporting blocks are used to report CSI for multiple RRHs/panels, in which one CSI reporting block contains common CSI for the multiple RRHs/panels and the other CSI reporting block contains individual CSI for the multiple RRHs/panels.

In one example, individual CSI for the multiple RRHs/panels contains an SD basis for each of the multiple RRHs/panels, and the SD basis is composed of beam vectors that are not included in the common SD basis of the common CSI block. In one example, individual CSI for the multiple RRHs/panels contains channel coefficients corresponding to the SD basis for each of the multiple RRHs/panels.

In one example II.1.2, $(N_{com}+N_{ind})$ CSI reporting blocks are used for reporting CSI for multiple RRHs/panels, in which the multiple RRHs/panels are partitioned into $N_{com}$ sets and each of $N_{com}$ CSI reporting blocks contains common CSI for each of the $N_{com}$ sets, and the $N_{ind}$ CSI reporting blocks contains individual CSI for the multiple RRHs/panels.

In one example II.1.2.1, $N_{com}=N_{RRH}/2$ and $N_{ind}=1$, where $N_{RRH}$ is the number of RRHs. In this case, each of the $N_{com}$ CSI reporting blocks contains common CSI for two RRHs/panels out of $N_{RRH}$ RRHs. The $N_{ind}$ CSI reporting block contains individual CSI for all of the multiple RRHs/panels. For example, the individual CSI comprises all of the independent SD bases and the corresponding channel coefficients for the $N_{RRH}$ RRHs. Here, the independent SD bases are composed of beam vectors that are not included in the common SD basis of the corresponding common CSI block.

In example II.1.2.2, $N_{com}=N_{RRH}/2$ and $N_{ind}=N_{RRH}$, where $N_{RRH}$ is the number of RRHs. In this case, each of the $N_{com}$ CSI reporting blocks contains common CSI for two RRHs (or panels) out of $N_{RRH}$ RRHs. Each of the $N_{ind}$ CSI reporting blocks contains individual CSI for each of the multiple RRHs/panels. For example, the individual CSI for each of the $N_{ind}$ CSI reporting blocks comprises each of the independent SD basis and the corresponding channel coefficients for each of the $N_{RRH}$ RRHs. Here, the independent SD basis is composed of beam vectors that are not included in the common SD basis of the corresponding common CSI block.

In embodiment II.2, one or multiple CSI reporting blocks contain common CSI for multiple RRHs/panels and each of the CSI reporting blocks contains a common FD basis for multiple RRHs/panels.

In one example, the common CSI at each of the CSI reporting blocks is indicated/reported according to embodiment I.3 (or an embodiment, e.g., I.3.1, I.3.2 . . . under embodiment I.3).

In one example, other remaining CSI reporting block(s) contain individual CSI for one or multiple RRHs/panels. The individual CSI for multiple RRHs/panels means that there is no common basis notion for the multiple RRHs/panels and thus SD/FD vectors and channel coefficients corresponding to SD/FD vector pairs are independently (not commonly) indicated/reported for each of the multiple RRHs/panels.

In one example II.2.1, two CSI reporting blocks are used to report CSI for multiple RRHs/panels, in which one CSI reporting block contains common CSI for the multiple RRHs/panels and the other CSI reporting block contains individual CSI for the multiple RRHs/panels.

In one example, individual CSI for the multiple RRHs/panels contain an FD basis for each of the multiple RRHs/panels, and the FD basis is composed of beam vectors that are not included in the common FD basis of the common CSI block. In one example, individual CSI for the multiple RRHs/panels contains channel coefficients corresponding to the FD basis for each of the multiple RRHs/panels.

In example II.2.2, ($N_{com}+N_{ind}$) CSI reporting blocks are used for reporting CSI for multiple RRHs/panels, in which the multiple RRHs/panels are partitioned into $N_{com}$ sets and each of $N_{com}$ CSI reporting blocks contains common CSI for each of the $N_{com}$ sets, and the $N_{ind}$ CSI reporting blocks contains individual CSI for the multiple RRHs/panels.

In example II.2.2.1, $$N_{com} = \frac{N_{RRH}}{2} \text{ and } N_{ind} = 1,$$

where $N_{RRH}$ is the number of RRHs. In this case, each of the $N_{com}$ CSI reporting blocks contains common CSI for two RRHs/panels out of $N_{RRH}$ RRHs. The $N_{ind}$ CSI reporting block contains individual CSI for all of the multiple RRHs/panels. For example, the individual CSI comprises all of the independent FD bases and the corresponding channel coefficients for the $N_{RRH}$ RRHs. Here, the independent FD bases are composed of beam vectors that are not included in the common FD basis of the corresponding common CSI block.

In one example II.2.2.2, $$N_{com} = \frac{N_{RRH}}{2} \text{ and } N_{ind} = N_{RRH},$$

is the number of RRHs. In this case, each of the $N_{com}$ CSI reporting blocks contains common CSI for two RRHs (or panels) out of $N_{RRH}$ RRHs. Each of the $N_{ind}$ CSI reporting blocks contains individual CSI for each of the multiple RRHs/panels. For example, the individual CSI for each of the $N_{ind}$ CSI reporting blocks comprises each of the independent FD basis and the corresponding channel coefficients for each of the $N_{RRH}$ RRHs. Here, the independent FD basis is composed of beam vectors that are not included in the common FD basis of the corresponding common CSI block.

In one embodiment II.3, one or multiple CSI reporting blocks contain common CSI for multiple RRHs/panels and each of the CSI reporting blocks contains common SD and FD bases for multiple RRHs/panels.

In one example, the common CSI at each of the CSI reporting blocks is indicated/reported according to embodiment I.1 (or an embodiment, e.g., I.1.1, I.1.2 . . . under embodiment I.1).

In one example, other remaining CSI reporting block(s) contain individual CSI for one or multiple RRHs/panels. The individual CSI for multiple RRHs/panels means that there is no common basis notion for the multiple RRHs/panels and thus SD/FD vectors and channel coefficients corresponding to SD/FD vector pairs are independently (not commonly) indicated/reported for each of the multiple RRHs/panels.

In one example II.3.1, two CSI reporting blocks are used to report CSI for multiple RRHs/panels, in which one CSI reporting block contains common CSI for the multiple RRHs/panels and the other CSI reporting block contains individual CSI for the multiple RRHs/panels.

In one example, individual CSI for the multiple RRHs/panels contains SD/FD bases for each of the multiple RRHs/panels, and the SD/FD bases are composed of beam vectors that are not included in the common SD/FD bases of the common CSI block.

In one example, individual CSI for the multiple RRHs/panels contains SD/FD bases for each of the multiple RRHs/panels, and the SD/FD bases contain some vectors that are included in the common SD/FD bases of the common CSI block.

In one example, individual CSI for the multiple RRHs/panels contains FD basis for each of the multiple RRHs/panels, and the FD basis is composed of beam vectors that are not included in the common SD/FD bases of the common CSI block.

In one example, individual CSI for the multiple RRHs/panels contains channel coefficients corresponding to a FD basis containing some vectors that are included in the common FD basis of the common CSI block, for each of the multiple RRHs/panels.

In one example, individual CSI for the multiple RRHs/panels contains SD basis for each of the multiple RRHs/panels, and the SD basis is composed of beam vectors that are not included in the common SD/FD bases of the common CSI block.

In another example, individual CSI for the multiple RRHs/panels contains channel coefficients corresponding to a SD basis containing some vectors that are included in the common SD basis of the common CSI block, for each of the multiple RRHs/panels.

In one example II.3.2, ($N_{com}+N_{ind}$) CSI reporting blocks are used for reporting CSI for multiple RRHs/panels, in which the multiple RRHs/panels are partitioned into $N_{com}$ sets and each of $N_{com}$ CSI reporting blocks contains common CSI for each of the $N_{com}$ sets, and the $N_{ind}$ CSI reporting blocks contains individual CSI for the multiple RRHs/panels.

In one example II.3.2.1, $$N_{com} = \frac{N_{RRH}}{2} \text{ and } N_{ind} = 1,$$

is the number of RRHs. In this case, each of the $N_{com}$ CSI reporting blocks contains common CSI for two RRHs/panels out of $N_{RRH}$ RRHs. The $N_{ind}$ CSI reporting block contains individual CSI for all of the multiple RRHs/panels.

In one example, the individual CSI comprises all of the independent SD/FD bases and the corresponding channel coefficients for the $N_{RRH}$ RRHs, where the independent SD/FD bases are composed of beam vectors that are not included in the common SD/FD bases of the corresponding common CSI block.

In one example, the individual CSI comprises all of the independent SD/FD bases and the corresponding channel coefficients for the $N_{RRH}$ RRHs, where the independent SD/FD bases contain some vectors that are included in the common SD/FD bases of the corresponding common CSI block.

In one example, the individual CSI comprises all of the independent SD basis and the corresponding channel coefficients for the $N_{RRH}$ RRHs, where the independent SD basis is composed of beam vectors that are not included in the common SD basis of the corresponding common CSI block.

In one example, the individual CSI comprises all of the independent SD basis and the corresponding channel coefficients for the $N_{RRH}$ RRHs, where the independent SD basis contains some vectors that are included in the common SD basis of the corresponding common CSI block.

In one example, the individual CSI comprises all of the independent FD basis and the corresponding channel coefficients for the $N_{RRH}$ RRHs, where the independent FD basis is composed of beam vectors that are not included in the common FD basis of the corresponding common CSI block.

In one example, the individual CSI comprises all of the independent FD basis and the corresponding channel coefficients for the $N_{RRH}$ RRHs, where the independent FD basis contains some vectors that are included in the common FD basis of the corresponding common CSI block.

In one example II.3.2.2, $$N_{com} = \frac{N_{RRH}}{2} \text{ and } N_{ind} = N_{RRH},$$

is the number of RRHs. In this case, each of the $N_{com}$ CSI reporting blocks contains common CSI for two RRHs (or panels) out of $N_{RRH}$ RRHs. Each of the $N_{ind}$ CSI reporting blocks contains individual CSI for each of the multiple RRHs/panels.

In one example, the individual CSI for each of the $N_{ind}$ CSI reporting blocks comprises each of the independent SD/FD bases and the corresponding channel coefficients for each of the $N_{RRH}$ RRHs, where the independent SD/FD bases are composed of beam vectors that are not included in the common SD/FD bases of the corresponding common CSI block.

In one example, the individual CSI for each of the $N_{ind}$ CSI reporting blocks comprises each of the independent SD/FD bases and the corresponding channel coefficients for each of the $N_{RRH}$ RRHs, where the independent SD/FD bases contains some vectors that are included in the common SD/FD bases of the corresponding common CSI block.

In one example, the individual CSI for each of the $N_{ind}$ CSI reporting blocks comprises each of the independent FD basis and the corresponding channel coefficients for each of the $N_{RRH}$ RRHs, where the independent FD basis is composed of beam vectors that are not included in the common FD basis of the corresponding common CSI block.

In one example, the individual CSI for each of the $N_{ind}$ CSI reporting blocks comprises each of the independent FD basis and the corresponding channel coefficients for each of the $N_{RRH}$ RRHs, where the independent FD basis contains some vectors that are included in the common FD basis of the corresponding common CSI block.

In one example, the individual CSI for each of the $N_{ind}$ CSI reporting blocks comprises each of the independent SD basis and the corresponding channel coefficients for each of the $N_{RRH}$ RRHs, where the independent SD basis is composed of beam vectors that are not included in the common SD basis of the corresponding common CSI block.

In one example, the individual CSI for each of the $N_{ind}$ CSI reporting blocks comprises each of the independent SD basis and the corresponding channel coefficients for each of the $N_{RRH}$ RRHs, where the independent SD basis contains some vectors that are included in the common SD basis of the corresponding common CSI block.

In one embodiment III, a UE is configured to report CSI via multiple CSI reporting instants (blocks) where each CSI reporting block contains common CSI.

In one embodiment IV.1, a UE is configured to report CSI at $N_{CSI}$ CSI reporting instants and the CSI reporting at each CSI reporting instant contains the CSI for each RRH. Hence, in this case, $N_{CSI}=N_{RRH}$, where $N_{RRH}$ is the number of RRHs.

In one embodiment IV.1.1, the CSI reporting at CSI reporting instant (block) i contains the CSI for the RRH having the i-th best channel quality out of $N_{RRH}$ RRHs, for i=0, 1, . . . , $N_{CSI}$−1.

In one example, each CSI reporting block i can contain the corresponding RRH index to indicate the i-th best RRH. In addition, each CSI reporting block i can contain the CSI components for the i-th best RRH, which are the same as those of Type-I SP or Type-II SP codebook. For example, for the case of Type-II codebook, the CSI components are given by a spatial domain (SD) beam basis, a frequency domain (FD) beam basis, and channel coefficients corresponding to SD and FD basis vector pairs.

In one example IV.1.1.1, each CSI reporting block i contains inter-RRH components for the (i+1)-th best RRH, for i=1, . . . , $N_{CSI}(=N_{RRH})$−1. Note that the first CSI reporting block 0 does not have to contain inter-RRH components since it has the strongest channel quality and thus can be the reference to compute inter-RRH components for the other RRHs.

In one example, inter-RRH components can contain phase value only. In another example, inter-RRH components can contain phase and amplitude. In another example, inter-RRH components can contain phase and power, and the inter-RRH power is the square of inter-RRH amplitude. In one example, inter-RRH components can be quantized as a QPSK, 8 PSK, or 16 PSK codebook for phase and 2/3/4-bit for amplitude or power, and can be reported.

In another example, inter-RRH components for the (i+1)-th best RRH (at the i-th CSI reporting instant) can be computed by using the reference as the previous RRH's reported CSI, i.e., at the (i−1)-th CSI reporting instant. In other words, for computing the inter-RRH components, the best RRH is the reference for the second best RRH, and the second best RRH is the reference for the third best RRH, and so on.

In one example IV.1.1.2, each CSI reporting block i does not contain inter-RRH components for i=0, • • • , $N_{CSI}(=N_{RRH})$−1. For example, this case can be relevant to the case that NW can perform dynamic RRH selection instead of transmitting coherently from multiple RRHs. For another example, this case can be relevant to the case that NW has known inter-RRH components for the $N_{RRH}$−1 RRHs, so may not need them.

In one example IV.1.1.3, all the inter-RRH components (for all RRHs relative to RRH 0) are included in report 0.

In one example IV.1.1.4, all the inter-RRH components (for all RRHs relative to RRH 0) are included in every report i=0, 1, • • • , $N_{CSI}(=N_{RRH})-1$.

In one example IV.1.1.5, all the inter-RRH components (for all RRHs relative to RRH 0) are included in some reports—which reports out of the $N_{CSI}$ reports can be configured via RRC.

In one example IV.1.1.6, all the inter-RRH components (for all RRHs relative to RRH 0) are included in a separate report (heavily encoded including with CRC).

In one embodiment IV.1.2, the CSI reporting at CSI reporting instant (block) i contains the CSI for the i-th RRH and the indexing i for the order of RRH CSI reporting is configured by NW or pre-determined.

In one example, each CSI reporting block i can contain the CSI components for the i-th RRH, which are the same as those of Type-I SP or Type-II SP codebook. For example, for the case of Type-II codebook, the CSI components are given by a spatial domain (SD) beam basis, a frequency domain (FD) beam basis, and channel coefficients corresponding to SD and FD basis vector pairs. Here, compared to example IV.1.1, each CSI reporting block does not have to contain RRH index, since it is already indicated by NW or predetermined.

In one example IV.1.2.1, each CSI reporting block i contains inter-RRH components for the i-th RRH, except the index of RRH having the best channel quality. In one example, a bit parameter to indicate the best RRH is defined and reported in the CSI reporting block i containing the CSI for the best RRH.

In one example, inter-RRH components can contain phase value only. In another example, inter-RRH components can contain phase and amplitude. In another example, inter-RRH components can contain phase and power, and the inter-RRH power is the square of inter-RRH amplitude. In one example, inter-RRH components can be quantized as a QPSK, 8 PSK, or 16 PSK codebook for phase and 2/3/4-bit for amplitude or power, and can be reported.

In one example IV.1.2.2, each CSI reporting block i does not contain inter-RRH components. For example, this case can be relevant to the case that the NW can perform dynamic RRH selection instead of transmitting coherently from multiple RRHs. For another example, this case can be relevant to the case that the NW has known inter-RRH components for the $N_{RRH}-1$ RRHs, so may not need them.

In one example IV.1.2.3, all the inter-RRH components (for all RRHs relative to RRH 0) are included in report 0.

In one example IV.1.2.4, all the inter-RRH components (for all RRHs relative to RRH 0) are included in every report i=0, 1, • • • , $N_{CSI}(=N_{RRH})-1$.

In one example IV.1.2.5, all the inter-RRH components (for all RRHs relative to RRH 0) are included in some reports—which reports out of the $N_{CSI}$ reports can be configured via RRC.

In one example IV.1.2.6, all the inter-RRH components (for all RRHs relative to RRH 0) are included in a separate report (heavily encoded including with CRC).

In one embodiment IV.2, a UE is configured to report CSI at $N_{CSI}$ CSI reporting instants and the CSI reporting at each CSI reporting instant contains the CSI for part of each RRH. Hence, in this case, $N_{CSI} \geq N_{RRH}$, where $N_{RRH}$ is the number of RRHs.

In one embodiment IV.2.1, The CSI reporting at a CSI reporting instant contains the CSI for each panel for each RRH. In one example, each RRH has one or multiple panels. In this case, $$N_{CSI} = \sum_{i=0}^{N_{RRH}-1} N_{g,i}, \text{ where } N_{g,i}$$

is the number of panels at RRH i.

In one example IV.2.1.1, the CSI reporting is performed in the order of best quality of panel. In other words, the first CSI reporting contains the best panel of the best RRH, and the second CSI reporting contains the second best panel of the best RRH, and so on. The last CSI reporting contains the worst panel of the worst RRH. In this case, the CSI reporting can also contain information of (the RRH index and panel index) to indicate the relevant panel and RRH for the CSI.

In one example IV.2.1.1.1, each CSI reporting block i (except the first CSI reporting block) contains either inter-panel components or inter-RRH components. For the CSI reporting block i containing different RRH's CSI from that of the previous CSI reporting block i−1, inter-RRH components are contained in the CSI reporting block i. For the CSI reporting block i containing the same RRH's CSI as that of the previous CSI reporting block i−1, inter-panel components are contained in the CSI reporting block i.

In one example, inter-panel components can contain phase value only. In another example, inter-panel components can contain phase and amplitude. In another example, inter-panel components can contain phase and power, and the inter-panel power is the square of inter-panel amplitude. In one example, inter-panel components can be quantized as a QPSK, 8 PSK, or 16 PSK codebook for phase and 2/3/4-bit for amplitude or power, and can be reported.

In one example, inter-RRH components can contain phase value only. In another example, inter-RRH components can contain phase and amplitude. In another example, inter-RRH components can contain phase and power, and the inter-RRH power is the square of inter-RRH amplitude. In one example, inter-RRH components can be quantized as a QPSK, 8 PSK, or 16 PSK codebook for phase and 2/3/4-bit for amplitude or power, and can be reported.

In one example, inter-RRH components and inter-panel components can have different quantization codebooks.

In example IV.2.1.1.2, for the CSI reporting block i containing different RRH's CSI from that of the previous CSI reporting block i−1, inter-RRH components are contained in the CSI reporting block i. (i.e., this case is the case where inter-panel components are not considered).

In one example IV.2.1.1.3, for the CSI reporting block i containing the same RRH's CSI as that of the previous CSI reporting block i−1, inter-panel components are contained in the CSI reporting block i. (i.e., this case is the case where inter-RRH components are not considered).

In one example IV.2.1.1.4, each CSI reporting block i does not contain inter-RRH nor inter-panel components. For example, this case can be relevant to the case that the NW can perform dynamic RRH/panels selection instead of transmitting coherently from multiple RRHs/panels. For another example, this case can be relevant to the case that the NW has known inter-RRH and inter-panel components for the $N_{RRH}-1$ RRHs with $\{N_{g,i}\}$, so may not need them.

In one example IV.2.1.2, the CSI reporting is performed in the order that is configured or predetermined by the NW. As configured or predetermined, the CSI reporting block i contains the CSI for the corresponding RRH/panel.

In one example IV.2.1.2.1, inter-RRH/panel components are reported according to example IV.2.1.1.1.

In one example IV.2.1.2.2, inter-RRH components are reported according to example IV.2.1.1.2.

In one example IV.2.1.2.3, inter-panel components are reported according to example IV.2.1.1.3.

In one example IV.2.1.2.4, inter-RRH/panel components are not reported according to example IV.2.1.1.4.

In one example IV.2.1.3, all the inter-RRH and/or inter-panel components (for all RRHs and panels relative to RRH 0 or panel 0) are included in report 0.

In one example IV.2.1.4, all the inter-RRH and/or inter-panel components (for all RRHs and panels relative to RRH 0 or panel 0) are included in every report i=0, 1, • • •, $N_{CSI}$−1.

In one example IV.2.1.5, all the inter-RRH and/or inter-panel components (for all RRHs and panels relative to RRH 0 or panel 0) are included in some reports—which reports out of the $N_{CSI}$ reports can be configured via RRC.

In one example IV.2.1.6, all the inter-RRH and/or inter-panel components (for all RRHs and panels relative to RRH 0 or panel 0) are included in a separate report (heavily encoded including with CRC).

In one embodiment IV.2.2, the CSI reporting at a CSI reporting instant contains part of SD and FD beam bases and channel coefficients corresponding to the SD and FD beam pairs of the part for a RRH. For example, for each RRH, selected SD and FD beam bases are split into several parts (e.g., two or four parts) and each part and corresponding channel coefficients are reported at a CSI reporting instant. For instance, if four parts are considered for each RRH, the number of CSI reporting instants equals $N_{CSI}=4N_{RRH}$.

In one example IV.2.2.1, for the CSI reporting block i containing different RRH's CSI from that of the previous CSI reporting block i−1, inter-RRH components are contained in the CSI reporting block i.

In one example, inter-panel components can contain phase value only. In another example, inter-panel components can contain phase and amplitude. In another example, inter-panel components can contain phase and power, and the inter-panel power is the square of inter-panel amplitude. In one example, inter-panel components can be quantized as a QPSK, 8 PSK, or 16 PSK codebook for phase and 2/3/4-bit for amplitude or power, and can be reported.

In one example, inter-RRH components can contain phase value only. In another example, inter-RRH components can contain phase and amplitude. In another example, inter-RRH components can contain phase and power, and the inter-RRH power is the square of inter-RRH amplitude. In one example, inter-RRH components can be quantized as a QPSK, 8 PSK, or 16 PSK codebook for phase and 2/3/4-bit for amplitude or power, and can be reported.

In one example IV.2.2.2, each CSI reporting block i does not contain inter-RRH components. For example, this case can be relevant to the case that NW can perform dynamic RRH selection instead of transmitting coherently from multiple RRHs. For another example, this case can be relevant to the case that NW has known inter-RRH components for the $N_{RRH}$−1 RRHs, so may not need them.

In one example IV.2.2.3, all the inter-RRH and/or inter-panel components (for all RRHs and panels relative to RRH 0 or panel 0) are included in report 0.

In one example IV.2.2.4, all the inter-RRH and/or inter-panel components (for all RRHs and panels relative to RRH 0 or panel 0) are included in every report i=0, 1, • • •, $N_{CSI}$−1.

In one example IV.2.2.5, all the inter-RRH and/or inter-panel components (for all RRHs and panels relative to RRH 0 or panel 0) are included in some reports—which reports out of the $N_{CSI}$ reports can be configured via RRC.

In one example IV.2.2.6, all the inter-RRH and/or inter-panel components (for all RRHs and panels relative to RRH 0 or panel 0) are included in a separate report (heavily encoded including with CRC).

In one embodiment IV.2.3, The CSI reporting at a CSI reporting instant contains part of SD beam basis and channel coefficients corresponding to the SD beams of the part for a RRH. For example, for each RRH, selected SD beam basis is split into several parts (e.g., two or four parts) and each part and corresponding channel coefficients are reported at a CSI reporting instant. For instance, if four parts are considered for each RRH, the number of CSI reporting instants equals $N_{CSI}=4N_{RRH}$.

In one example IV.2.3.1, inter-RRH/panel components are indicated/reported according to example IV.2.2.1.

In one example IV.2.3.2, inter-RRH/panel components are indicated/reported according to example IV.2.2.2.

In one example IV.2.3.3, inter-RRH/panel components are indicated/reported according to example IV.2.2.3.

In one example IV.2.3.4, inter-RRH/panel components are indicated/reported according to example IV.2.2.4.

In one example IV.2.3.5, inter-RRH/panel components are indicated/reported according to example IV.2.2.5.

In one example IV.2.3.6, inter-RRH/panel components are indicated/reported according to example IV.2.2.6.

In one embodiment IV.2.4, the CSI reporting at a CSI reporting instant contains part of FD beam basis and channel coefficients corresponding to the FD beams of the part for a RRH. For example, for each RRH, selected FD beam basis is split into several parts (e.g., two or four parts) and each part and corresponding channel coefficients are reported at a CSI reporting instant. For instance, if four parts are considered for each RRH, the number of CSI reporting instants equals $N_{CSI}=4N_{RRH}$.

In one example IV.2.4.1, inter-RRH/panel components are indicated/reported according to example IV.2.2.1.

In example IV.2.4.2, inter-RRH/panel components are indicated/reported according to example IV.2.2.2.

In one example IV.2.4.3, inter-RRH/panel components are indicated/reported according to example IV.2.2.3.

In one example IV.2.4.4, inter-RRH/panel components are indicated/reported according to example IV.2.2.4.

In one example IV.2.4.5, inter-RRH/panel components are indicated/reported according to example IV.2.2.5.

In one example IV.2.4.6, inter-RRH/panel components are indicated/reported according to example IV.2.2.6.

In one embodiment IV.3, a UE is configured to report CSI at $N_{CSI}$ CSI reporting instants and the CSI reporting at each CSI reporting instant contains the CSI for one or multiple RRHs. Hence, in this case, $N_{CSI} \leq N_{RRH}$, where $N_{RRH}$ is the number of RRHs.

In one embodiment IV.3.1, a number of groups can be configured or predetermined and each group contains one or multiple RRHs. In one example, there are G groups and $$N_{RRH} = \sum_{g=0}^{G-1} N_{RRH,g}, \text{ where } N_{RRH,g}$$

is the number of RRHs at group g. The CSI reporting at each reporting instant i contains the CSI for the RRHs in group i.

In one example IV.3.1.1, the CSI reporting at each reporting instant i contains inter-RRH components for the RRHs in group i. For the CSI reporting containing the CSI for the best RRH, the inter-RRH components for the best RRH may not be contained (or no need to report).

In one example IV.3.1.2, each CSI reporting block i does not contain inter-RRH components. For example, this case can be relevant to the case that NW can perform dynamic RRH selection instead of transmitting coherently from multiple RRHs. For another example, this case can be relevant to the case that NW has known inter-RRH components for the $N_{RRH}-1$ RRHs, so may not need them.

In one example IV.3.1.3, all the inter-RRH and/or inter-panel components (for all RRHs and panels relative to RRH 0 or panel 0) are included in report 0.

In one example IV.3.1.4, all the inter-RRH and/or inter-panel components (for all RRHs and panels relative to RRH 0 or panel 0) are included in every report i=0, 1, • • •, $N_{CSI}-1$.

In one example IV.3.1.5, all the inter-RRH and/or inter-panel components (for all RRHs and panels relative to RRH 0 or panel 0) are included in some reports—which reports out of the $N_{CSI}$ reports can be configured via RRC.

In one example IV.3.1.6, all the inter-RRH and/or inter-panel components (for all RRHs and panels relative to RRH 0 or panel 0) are included in a separate report (heavily encoded including with CRC).

In one embodiment IV.3.2, the $N_{CSI}$ CSI reporting blocks contain the CSI for $N_{CSI}$ RRHs out of the $N_{RRH}(\geq N_{CSI})$ RRHs.

In one example IV.3.2.1, the CSI reporting at CSI reporting instant (block) i contains the CSI for the RRH having the i-th best channel quality out of $N_{RRH}$ RRHs, for i=0, 1, • • •, $N_{CSI}-1$. In other words, the UE reports the CSI for the best $N_{CSI}$ RRHs out of $N_{RRH}$ RRHs. Each CSI reporting can contain the corresponding RRH index.

In one example IV.3.2.1.1, inter RRH components are reported according to example IV.1.1.1.

In one example IV.3.2.1.2, inter RRH components are reported according to example IV.1.1.2.

In one example IV.3.2.1.3, inter RRH components are reported according to example IV.1.1.3.

In one example IV.3.2.1.4, inter RRH components are reported according to example IV.1.1.4.

In one example IV.3.2.1.5, inter RRH components are reported according to example IV.1.1.5.

In one example IV.3.2.1.6, inter RRH components are reported according to example IV.1.1.6.

In one example IV.3.2.2, the CSI reporting at CSI reporting instant (block) i contains the CSI for the i-th RRH and the indexing i for the order of RRH CSI reporting is configured by NW or pre-determined.

In one example IV.3.2.2.1, inter RRH components are reported according to example IV.1.2.1.

In one example IV.3.2.2.2, inter RRH components are reported according to example IV.1.2.2.

In one example IV.3.2.2.3, inter RRH components are reported according to example IV.1.2.3.

In one example IV.3.2.2.4, inter RRH components are reported according to example IV.1.2.4.

In one example IV.3.2.2.5, inter RRH components are reported according to example IV.1.2.5.

In one example IV.3.2.2.6, inter RRH components are reported according to example IV.1.2.6.

In embodiment IV.3.3, the UE can be configured with a threshold and criteria. In one example, the UE can be configured to report CSI for the RRHs whose channel qualities exceeds the threshold. In one example, the channel qualities are RSRP, RSRQ or SINR.

In one example IV.3.3.1, the CSI reporting at each CSI reporting instant contains the CSI for the RRH having the i-th best channel quality and satisfying the criteria, for i=0, 1, • • •, $N_{CSI}-1$. Each CSI reporting can contain the corresponding RRH index.

In one example IV.3.3.1.1, inter RRH components are reported according to example IV.1.1.1.

In one example IV.3.3.1.2, inter RRH components are reported according to example IV.1.1.2.

In one example IV.3.3.1.3, inter RRH components are reported according to example IV.1.1.3.

In one example IV.3.3.1.4, inter RRH components are reported according to example IV.1.1.4.

In one example IV.3.3.1.5, inter RRH components are reported according to example IV.1.1.5.

In one example IV.3.3.1.6, inter RRH components are reported according to example IV.1.1.6.

In one example, the UE reports the actual number of CSI reporting blocks, $\overline{N}_{CSI}(\leq N_{CSI})$ because there may be a smaller number of RRHs than $N_{CSI}$ satisfying the configured criteria.

In one example IV.3.3.2, the CSI reporting at CSI reporting instant (block) i contains the CSI for the i-th RRH with satisfying the criteria, and the indexing i for the order of RRH CSI reporting is configured by NW or pre-determined.

In one example IV.3.3.2.1, inter RRH components are reported according to example IV.1.2.1.

In one example IV.3.3.2.2, inter RRH components are reported according to example IV.1.2.2.

In one example IV.3.3.2.3, inter RRH components are reported according to example IV.1.2.3.

In one example IV.3.3.2.4, inter RRH components are reported according to example IV.1.2.4.

In one example IV.3.3.2.5, inter RRH components are reported according to example IV.1.2.5.

In one example IV.3.3.2.6, inter RRH components are reported according to example IV.1.2.6.

In one embodiment IV.4, a UE is configured to report CSI at multiple CSI reporting instants. The CSI reporting at each CSI reporting instant contains the CSI for a layer.

In one embodiment IV.4.1, the number of CSI blocks is equal to $N_{CSI}=v$, where v is the rank value reported via RI. For each CSI block i, the CSI reporting contains CSI for multiple RRHs/panels for layer i.

In embodiment IV.4.2, the number of CSI blocks is equal to $$N_{CSI} = \sum_{i=1}^{v} N_{part,i},$$

where v is the rank value reported via RI, and $N_{part,i}$ is the number of CSI blocks to report the CSI for layer i=1, 2, • • • v. For each CSI layer i, the number of CSI reporting blocks is equal to $N_{part,i}$, and the UE reports the CSI for multiple RRHs/panels for layer i using the $N_{part,i}$ CSI reporting blocks. In one example, $N_{part,i}=N_{part}, \forall i=1, • • •,$ v.

Any of the above variation embodiments can be utilized independently or in combination with at least one other variation embodiment.

Figure 13:
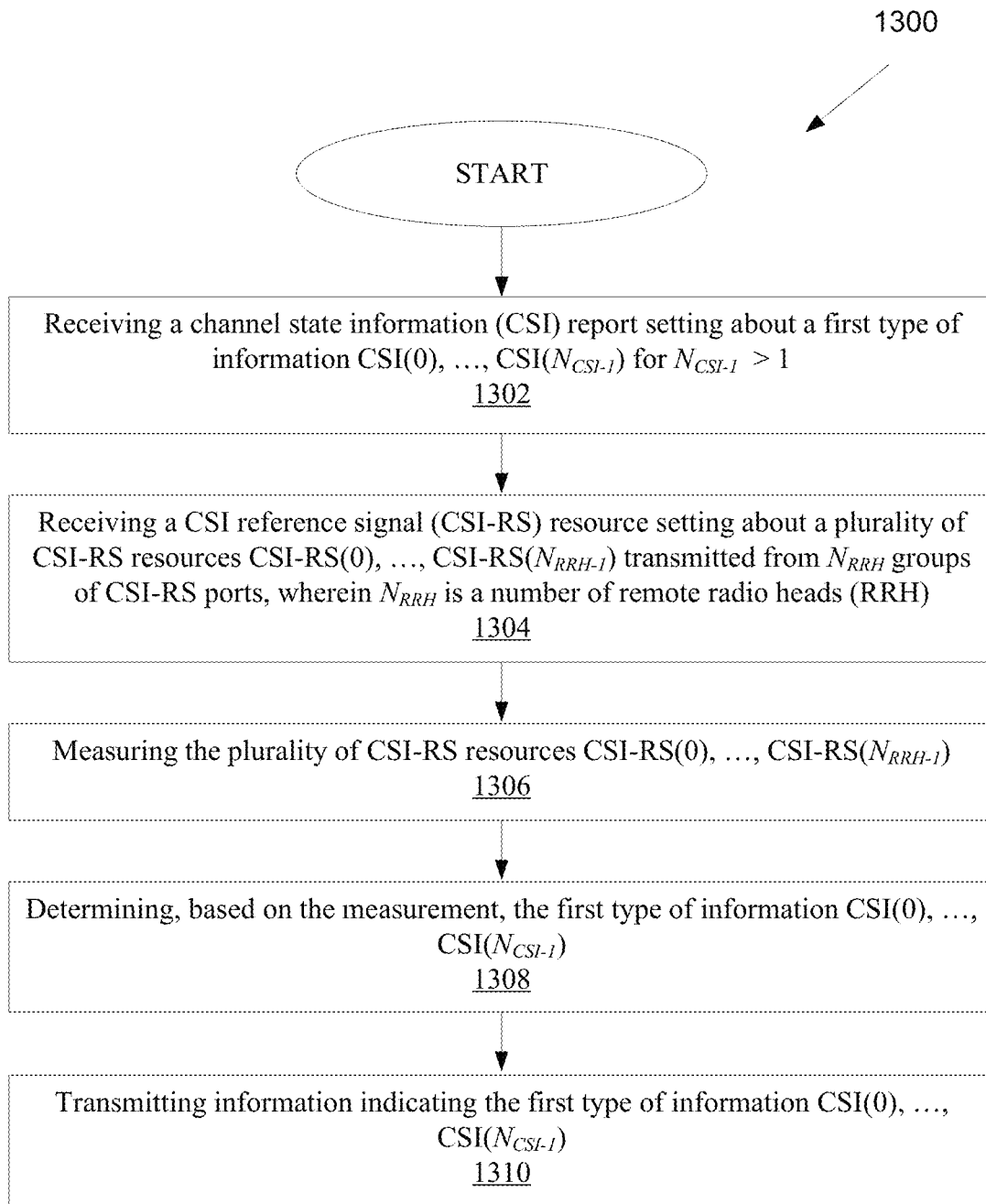
FIG. 13 illustrates a flow chart of a method for operating a UE according to embodiments of the present disclosure.

FIG. 13 illustrates a flow chart of a method 1300 for operating a user equipment (UE), as may be performed by a UE such as UE 116, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the UE (e.g., 111-116 as illustrated in FIG. 1) receives a channel state information (CSI) report setting about a first type of information CSI(0), ..., CSI($N_{CSI}$-1) for $N_{CSI}$>1.

In step 1304, the UE receives a CSI reference signal (CSI-RS) resource setting about a plurality of CSI-RS resources, CSI-RS(0), ..., CSI-RS($N_{RRH}$-1) transmitted from $N_{RRH}$ groups of CSI-RS ports, wherein $N_{RRH}$ is a number of remote radio heads (RRH).

In step 1306, the UE measures the plurality of CSI-RS resources CSI-RS(0), ..., CSI-RS($N_{RRH}$-1).

In step 1308, the UE determines, based on the measurement, the first type of information CSI(0), ..., CSI($N_{CSI}$-1).

In step 1310, the UE transmits information indicating the first type of information CSI(0), ..., CSI($N_{CSI}$-1).

In one embodiment, when $N_{CSI}$=$N_{RRH}$, CSI(i) comprises: a CSI of an i-th RRH for i=0, • • • , $N_{CSI}$-1; and an inter-RRH component for the (i)-th RRH for i=1, • • •, $N_{CSI}$-1.

In one embodiment, when $$N_{CSI} = \sum_{j=0}^{N_{RRH}-1} N_{g,j}, \text{ where } N_{g,j}$$

is a number of panels at RRH j, CSI(i) comprises a CSI of an n-th panel of a j-th RRH, where $$i = n + \sum_{k=0}^{j-1} N_{g,k}.$$

In one embodiment, when $N_{CSI}$=$N_{CSI,perRRH}N_{RRH}$, where $N_{CSI,perRRH}$>1 is a number of CSI report settings per RRH, CSI(i·$N_{CSI,perRRH}$), ..., CSI(i·$N_{CSI,perRRH}$+($N_{CSI,perRRH}$-1)) comprise a CSI of an i-th RRH, for i=0, • • • , $N_{RRH}$-1.

In one embodiment, when $N_{CSI}$=G, where $$N_{RRH} = \sum_{g=0}^{G-1} N_{RRH,g} N_{RRH,g}$$

is a number of RRHs at a group g, CSI(g) comprises: a CSI for RRHs in a group g=0, • • • , G-1; and inter-RRH components for RRHs associated with the group g=0, • • • , G-1.

In one embodiment, $N_{CSI}$=$N_{com}$+$N_{ind}$, where each CSI report setting includes either common CSI or individual CSI, $N_{com}$, is a number of CSI report settings that include common CSI, and $N_{ind}$ is a number of CSI report settings that include individual CSI for the RRHs.

In one embodiment, each CSI report setting corresponds to a CSI report, or CSI report settings correspond to multiple CSI reports.

Figure 14:
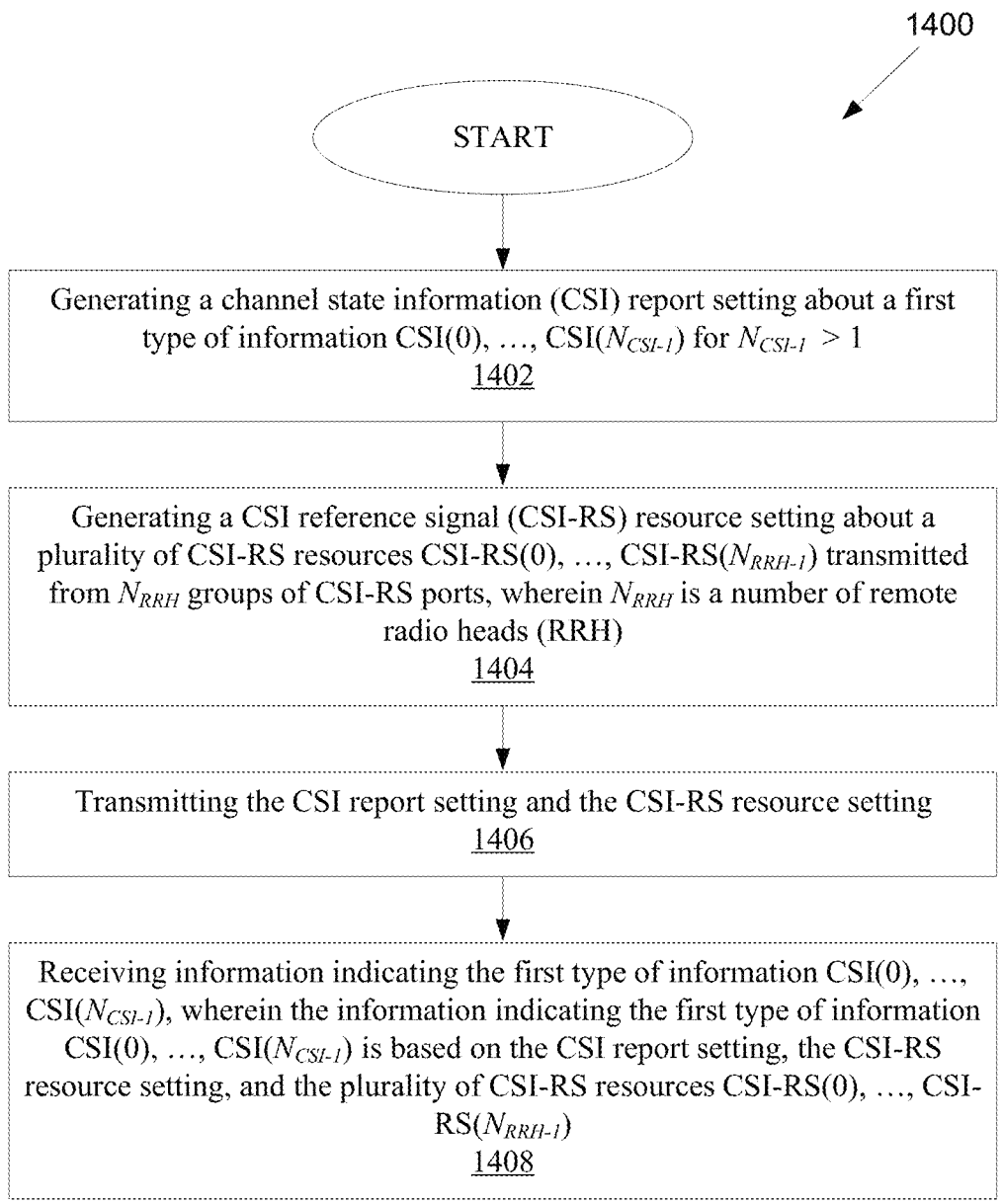
FIG. 14 illustrates a flow chart of a method for operating a BS according to embodiments of the present disclosure.

FIG. 14 illustrates a flow chart of another method 1400, as may be performed by a base station (BS) such as BS 102, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates a channel state information (CSI) report setting about a first type of information CSI(0), ..., CSI($N_{CSI}$-1) for $N_{CSI}$>1.

In step 1404, the BS generates a CSI reference signal (CSI-RS) resource setting about a plurality of CSI-RS resources CSI-RS(0), ..., CSI-RS($N_{RRH}$-1) transmitted from $N_{RRH}$ groups of CSI-RS ports, wherein $N_{RRH}$ is a number of remote radio heads (RRH).

In step 1406, the BS transmits the CSI report setting and the CSI-RS resource setting.

In step 1408, the BS receives information indicating the first type of information CSI(0), ..., CSI($N_{CSI}$-1); wherein the information indicating the first type of information CSI(0), ..., CSI($N_{CSI}$-1) is based on the at least one CSI report setting, the at least one CSI-RS resource setting, and the plurality of CSI-RS resources CSI-RS(0), ..., CSI-RS ($N_{RRH}$-1).

In one embodiment, when $N_{CSI}$=$N_{RRH}$, CSI(i) comprises: a CSI of an i-th RRH for i=0, • • • , $N_{CSI}$-1; and an inter-RRH component for the (i)-th RRH for i=1, • • •, $N_{CSI}$-1.

In one embodiment, when $$N_{CSI} = \sum_{j=0}^{N_{RRH}-1} N_{g,j}, \text{ where } N_{g,j}$$

is a number of panels at RRH j, CSI(i) comprises a CSI of an n-th panel of a j-th RRH, where $$i = n + \sum_{k=0}^{j-1} N_{g,k}.$$

In one embodiment, when $N_{CSI}$=$N_{CSI,perRRH}N_{RRH}$, where $N_{CSI,perRRH}$>1 is a number of CSI report settings per RRH, CSI(i·$N_{CSI,perRRH}$), ..., CSI(i·$N_{CSI,perRRH}$+($N_{CSI,perRRH}$-1)) comprise a CSI of an i-th RRH, for i=0, • • • , $N_{RRH}$-1.

In one embodiment, when $N_{CSI}$=G, where $$N_{RRH} = \sum_{g=0}^{G-1} N_{RRH,g} \text{ and } N_{RRH,g}$$

is a number of RRHs at a group g, CSI(g) comprises: a CSI for RRHs in a group g=0, • • • , G-1; and inter-RRH components for RRHs associated with the group g=0, • • • , G-1.

In one embodiment, $N_{CSI}$=$N_{com}$+$N_{ind}$, where each CSI report setting includes either common CSI or individual CSI, $N_{com}$ is a number of CSI report settings that include common CSI, and $N_{ind}$ is a number of CSI report settings that include individual CSI for the RRHs.

In one embodiment, each CSI report setting corresponds to a CSI report, or CSI report settings correspond to multiple CSI reports.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive a channel state information (CSI) report setting about a first type of information CSI(0), . . . , CSI($N_{CSI-1}$) for $N_{CSI}>1$; and
receive a CSI reference signal (CSI-RS) resource setting about a plurality of CSI-RS resources, CSI-RS(0), . . . , CSI-RS($N_{RRH}-1$) transmitted from $N_{RRH}$ groups of CSI-RS ports, wherein $N_{RRH}$ is a number of remote radio heads (RRH); and
a processor operably coupled to the transceiver, the processor configured, to:
measure the plurality of CSI-RS resources CSI-RS(0), . . . , CSI-RS($N_{RRH}-1$); and
determine, based on the measurement, the first type of information CSI(0), . . . , CSI($N_{CSI}-1$),
wherein the transceiver is configured to transmit information indicating the first type of information CSI(0), . . . , CSI($N_{CSI}-1$).

2. The UE of claim 1, wherein when $N_{CSI}=N_{RRH}$, CSI(i) comprises:
a CSI of an i-th RRH for i=0, • • •, $N_{CSI}-1$; and
an inter-RRH component for the (i)-th RRH for i=1, • • •, $N_{CSI}-1$.

3. The UE of claim 1, wherein when $$N_{CSI} = \sum_{j=0}^{N_{RRH}-1} N_{g,j}, \text{ where } N_{g,j}$$

is a number of panels at RRH j, CSI(i) comprises a CSI of an n-th panel of a j-th RRH, where $$i = n + \sum_{k=0}^{j-1} N_{g,k}.$$

4. The UE of claim 1, wherein when $N_{CSI}=N_{CSI,perRRH}N_{RRH}$, where $N_{CSI,perRRH}>1$ is a number of CSI report settings per RRH, CSI(i·$N_{CSI,perRRH}$), . . . , CSI(i·$N_{CSI,perRRH}+(N_{CSI,perRRH}-1)$) comprise a CSI of an i-th RRH, for i=0, • • •, $N_{RRH}-1$.

5. The UE of claim 1, wherein when $N_{CSI}=G$, where $N_{RRH}=\sum_{g=0}^{G-1} N_{RRH,g}$ and $N_{RRH,g}$ is a number of RRHs at a group g, CSI(g) comprises:
a CSI for RRHs in a group g=0, • • •, G-1; and
inter-RRH components for RRHs associated with the group g=0, • • •, G-1.

6. The UE of claim 1, wherein $N_{CSI}=N_{com}+N_{ind}$, where each CSI report setting includes either common CSI or individual CSI, $N_{com}$ is a number of CSI report settings that include common CSI, and $N_{ind}$ is a number of CSI report settings that include individual CSI for the RRHs.

7. The UE of claim 1, wherein:
each CSI report setting corresponds to a CSI report, or CSI report settings correspond to multiple CSI reports.

8. A base station (BS) comprising:
a processor configured to:
generate a channel state information (CSI) report setting about a first type of information CSI(0), . . . , CSI($N_{CSI}-1$) for $N_{CSI}>1$; and
generate a CSI reference signal (CSI-RS) resource setting about a plurality of CSI-RS resources CSI-RS(0), . . . , CSI-RS($N_{RRH}-1$) transmitted from $N_{RRH}$ groups of CSI-RS ports, wherein $N_{RRH}$ is a number of remote radio heads (RRH); and
a transceiver operably coupled to the processor, the transceiver configured to:
transmit the CSI report setting and the CSI-RS resource setting; and
receive information indicating the first type of information CSI(0), . . . , CSI($N_{CSI}-1$);
wherein the information indicating the first type of information CSI(0), . . . , CSI($N_{CSI}-1$) is based on the at least one CSI report setting, the at least one CSI-RS resource setting, and the plurality of CSI-RS resources CSI-RS(0), . . . , CSI-RS($N_{RRH}-1$).

9. The BS of claim 8, wherein when $N_{CSI}=N_{RRH}$, CSI(i) comprises:
a CSI of an i-th RRH for i=0, • • •, $N_{CSI}-1$; and
an inter-RRH component for the (i)-th RRH for i=1, • • •, $N_{CSI}-1$.

10. The BS of claim 8, wherein when $$N_{CSI} = \sum_{j=0}^{N_{RRH}-1} N_{g,j} \text{ where } N_{g,j}$$

is a number of panels at RRH j, CSI(i) comprises a CSI of an n-th panel of a j-th RRH, where $$i = n + \sum_{k=0}^{j-1} N_{g,k}.$$

11. The BS of claim 8, wherein when $N_{CSI}=N_{CSI,perRRH}N_{RRH}$, where $N_{CSI,perRRH}>1$ is a number of CSI report settings per RRH, CSI(i·$N_{CSI,perRRH}$), . . . , CSI(i·$N_{CSI,perRRH}+(N_{CSI,perRRH}-1)$) comprise a CSI of an i-th RRH, for i=0, • • •, $N_{RRH}-1$.

12. The BS of claim 8, wherein when $N_{CSI}=G$, where $$N_{RRH} = \sum_{g=0}^{G-1} N_{RRH,g} \text{ and } N_{RRH,g}$$

is a number of RRHs at a group g, CSI(g) comprises:
a CSI for RRHs in a group g=0, • • •, G-1; and
inter-RRH components for RRHs associated with the group g=0, • • •, G-1.

13. The BS of claim 8, wherein $N_{CSI}=N_{com}+N_{ind}$, where each CSI report setting includes either common CSI or individual CSI, $N_{com}$ is a number of CSI report settings that include common CSI, and $N_{ind}$ is a number of CSI report settings that include individual CSI for the RRHs.

14. The BS of claim 8, wherein:
each CSI report setting corresponds to a CSI report, or CSI report settings correspond to multiple CSI reports.

15. A method for operating a user equipment (UE), the method comprising:
receiving a channel state information (CSI) report setting about a first type of information CSI(0), . . . , CSI($N_{CSI-1}$) for $N_{CSI}>1$;
receiving a CSI reference signal (CSI-RS) resource setting about a plurality of CSI-RS resources, CSI-RS(0), . . . , CSI-RS($N_{RRH}-1$) transmitted from $N_{RRH}$ groups of CSI-RS ports, wherein $N_{RRH}$ is a number of remote radio heads (RRH);

measuring the plurality of CSI-RS resources CSI-RS(0), ..., CSI-RS($N_{RRH}$−1);

determining, based on the measurement, the first type of information CSI(0), ..., CSI($N_{CSI}$−1); and transmitting information indicating the first type of information CSI(0), ..., CSI($N_{CSI}$−1).

16. The method of claim 15, wherein when $N_{CSI}=N_{RRH}$, CSI(i) comprises:

a CSI of an i-th RRH for i=0, •••, $N_{CSI}$−1; and an inter-RRH component for the (i)-th RRH for i=1, •••, $N_{CSI}$−1.

17. The method of claim 15, wherein when $$N_{CSI} = \sum_{j=0}^{N_{RRH}-1} N_{g,j}, \text{ where } N_{g,j}$$

is a number of panels at RRH j, CSI(i) comprises a CSI of an n-th panel of a j-th RRH, where $$i = n + \sum_{k=0}^{j-1} N_{g,k}.$$

18. The method of claim 15, wherein when $N_{CSI}=N_{CSI,perRRH}N_{RRH}$, where $N_{CSI,perRRH}>1$ is a number of CSI report settings per RRH, CSI(i·$N_{CSI,perRRH}$), ..., CSI(i·$N_{CSI,perRRH}$+($N_{CSI,perRRH}$−1)) comprise a CSI of an i-th RRH, for i=0, •••, $N_{RRH}$−1.

19. The method of claim 15, wherein when $N_{CSI}=G$, where $$N_{RRH} = \sum_{g=0}^{G-1} N_{RRH,g} \text{ and } N_{RRH,g}$$

is a number of RRHs at a group g, CSI(g) comprises:

a CSI for RRHs in a group g=0, •••, G−1; and inter-RRH components for RRHs associated with the group g=0, •••, G−1.

20. The method of claim 15, wherein $N_{CSI}=N_{com}+N_{ind}$, where each CSI report setting includes either common CSI or individual CSI, $N_{com}$ is a number of CSI report settings that include common CSI, and $N_{ind}$ is a number of CSI report settings that include individual CSI for the RRHs.

* * * * *